United States Patent
Cordara et al.

(10) Patent No.: US 9,008,424 B2
(45) Date of Patent: Apr. 14, 2015

(54) METHOD AND SYSTEM FOR COMPARING IMAGES

(75) Inventors: Giovanni Cordara, Turin (IT); Gianluca Francini, Turin (IT); Skjalg Lepsoy, Turin (IT); Pedro Porto Buarque de Gusmao, Sau Paulo (BR)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 13/981,824

(22) PCT Filed: Jan. 25, 2011

(86) PCT No.: PCT/EP2011/050994
§ 371 (c)(1),
(2), (4) Date: Jul. 25, 2013

(87) PCT Pub. No.: WO2012/100819
PCT Pub. Date: Aug. 2, 2012

(65) Prior Publication Data
US 2013/0308861 A1 Nov. 21, 2013

(51) Int. Cl.
*G06K 9/00* (2006.01)
*G06K 9/46* (2006.01)
*G06K 9/68* (2006.01)
*G06K 9/62* (2006.01)

(52) U.S. Cl.
CPC ............... *G06K 9/68* (2013.01); *G06K 9/6211* (2013.01)

(58) Field of Classification Search
USPC .................. 382/159, 168, 170, 201, 224, 228
See application file for complete search history.

(56) References Cited

U.S. PATENT DOCUMENTS

| 2006/0165277 A1 | 7/2006 | Shan et al. ................... 382/159 |
| 2010/0135527 A1* | 6/2010 | Wu et al. ..................... 382/103 |
| 2010/0183229 A1* | 7/2010 | Ruzon et al. ................. 382/197 |
| 2012/0011119 A1* | 1/2012 | Baheti et al. ................. 707/737 |

OTHER PUBLICATIONS

Fleck D. et al., "An Evaluation of Affine Invariant-Based Classification for Image Matching", Advances in Visual Computing, pp. 417-429, XP 019135110, (Nov. 30, 2009).
Fleck D. et al. "Affine Invariant-Based Classification of Inliers and Outlier for Image Matching", Image Analysis and Recognition, pp. 268-277, XP 019122387 (Jul. 6, 2009).
Tsai, S. S. et al. "Fast geometric re-ranking for image-based retrieval", Image Processing (ICIP), 2010 17th IEEE International Conference on, IEEE Piscataway, pp. 1029-1032, XP 031810692 (Sep. 26-29, 2010).

(Continued)

*Primary Examiner* — Yon Couso
(74) *Attorney, Agent, or Firm* — Oblon, McClelland, Maier & Neustadt, L.L.P.

(57) ABSTRACT

A method for comparing a first image with a second image. The method identifies first keypoints in the first image and second keypoints in the second image and associates each first keypoint with a corresponding second keypoint to form a corresponding keypoint match. For each pair of first keypoints, the method further calculates the distance therebetween for obtaining a corresponding first length. Similarly, for each pair of second keypoints, the method calculates the distance therebetween for obtaining a corresponding second length. The method further calculates a plurality of distance ratios; each distance ratio is based on a length ratio between a selected one between a first length and a second length and a corresponding selected one between a second length and a first length, respectively.

17 Claims, 22 Drawing Sheets

(56) References Cited

OTHER PUBLICATIONS

Zhang, W. et al., "Ensemble Method for Robust Motion Estimation", Computer Vision and Pattern Recognition Workshop, 2006 Conference, total pp. 8, XP 010922913, (Jun. 17, 2006).

Chin, Tat-Jun et al., "Accelerated Hypothesis Generation for Multi-structure Robust Fitting", Computer Vision a ECCV 2010, pp. 533-546, XP 019150648, (Sep. 5, 2010).

McIlroy, P. et al., "Deterministic sample consensus with multiple match hypotheses", British Machine Vision Conference, pp. 1-11, XP002639872, (Aug. 31, 2010).

Li, D. et al, "Shape retrieval based on distance ratio distribution", HP Laboratories Palo Alto Intelligent Enterprise Technologies Laboratory, Retrieved from the Internet: URL:http:// citeseerx,ist.psu/edu/viewdoc/download?doi=10.1.1.87.8062&rep=rep1&type=pdf, XP 002639873, (Jul. 30, 2002).

International Search Report Issued Jun. 14, 2011 in PCT/EP11/050994 Filed Jan. 25, 2011.

U.S. Appl. No. 14/370,098, filed Jul. 1, 2014, Francini, et al.

\* cited by examiner second phase third phase

METHOD AND SYSTEM FOR COMPARING IMAGES

BACKGROUND OF THE INVENTION

1. Field of the Invention

The present invention relates to the field of the image analysis.

2. Description of the Related Art

In the field of the image analysis, a common operation provides for comparing two images in order to find the relation occurring therebetween in case both the images include at least a portion of a same scene or of a same object.

Among a high number of applications, the image comparison is of the utmost importance for calibrating video cameras belonging to a multi-camera system, for assessing the motion occurring between two frames of a video shoot, and for the recognition of an object within an image (e.g., a picture). The latter application is now assuming more and more importance due to the recent development of object recognition algorithms specifically designed to be employed in the so-called visual searching engines, i.e., automated services that, starting from a picture, are capable of identifying the object(s) pictured therein and offering information related to the identified object(s). Examples of known services of this type include Google Goggles, Nokia Point&Find, and kooaba SmartVisuals. An object recognition application provides for comparing a first image—in jargon, referred to as "query image"—depicting an object to be recognized with a plurality of reference images, each one depicting a respective known object; this allows to perform a comparison among the object depicted in the query image and the objects depicted in the reference images.

The reference images are typically arranged in a proper reference database. The higher the number of reference images included in the database, the higher the number of comparing operations to be performed. In some cases the reference database may become very large, negatively affecting the efficiency of the object recognition process. For example, in case the object recognition is exploited in an online shopping scenario, wherein each reference image corresponds to an item offered by an online store (e.g., the picture of a book cover, a DVD cover and/or a CD cover), the number of reference images may exceed few millions of unities. Moreover, in order to efficiently manage such huge amount of data, the comparing operations should be performed by a processing unit provided with a sufficient processing power.

In the last decade, different algorithms have been proposed for reducing the time required to perform object recognition. These algorithms provides for heavily reducing the number of reference images which are candidate to include the object depicted in the query image.

A very efficient way for performing comparing operations between two images provides for selecting a set of points—in jargon, referred to as keypoints—in the first image and then matching each keypoint of the set to a corresponding keypoint in the second image. The selection of which point of the first image has to become a keypoint is carried out by taking into consideration local features of the area of the image surrounding the point itself. On this regard, see "Distinctive image features from scale-invariant keypoints" by David G. Lowe, *International Journal of computer vision*, 2004.

If a matching between a keypoint of the first image and a corresponding keypoint of the second image is correct, in the sense that both keypoints correspond to a same point of a same object (depicted in both the two images), such keypoint match is referred to as "inlier".

Conversely, if a matching between a keypoint of the first image and a corresponding keypoint of the second image is incorrect, in the sense that the two keypoints do not correspond to a same point of the same object, such keypoint match is referred to as "outlier".

Therefore, in order to obtain a reliable result, a procedure capable of distinguishing the inliers from the outliers is advantageously performed after the keypoint matches have been determined.

Several examples of procedures of this type are already known in the art.

The most used procedure makes use of the RANSAC algorithm disclosed in "Random sample consensus: A paradigm for model fitting with applications to image analysis and automated cartography" by Martin A. Fischler and Robert C. Bolles, *Communications of the ACM,* 24(6):381-395, June 1981. However, this algorithm is time consuming, because is based on an iterative approach.

The algorithms disclosed in "Fast geometric re-ranking for image-based retrieval" by Sam S. Tsai, Davide Chen, Gabriel Takacs, Vijay Chandrasekhar, Ramakrishna Vedantham, Radek Grzeszczuk, Bernd Girod, *International Conference on Image Processing*, October 2010, and in the international patent application WO2009/130451 are based on the fact that the ratio between the distances of keypoints is an invariant under translation, rotation, and scaling. Further algorithms of this type are also disclosed in "Adding Affine Invariant Geometric Constraint for Partial-Duplicate Image Retrieval" by Zhipeng Wu, Qianqian Xu, Shuqiang Jiang, Qingming Huang, Peng Cui, Liang Li, *International Conference on Pattern Recognition*, August 2010, pages 842-845, and in "Using Local Affine Invariants to Improve Image Matching" by Daniel Fleck, Zoran Duric, 20*th International Conference on Pattern Recognition,* 2010, pages 1844-1847.

Further, US 2010/0135527 A1 discloses an image recognition algorithm including a keypoints-based comparison and a region-based color comparison. A method of identifying a target image using the algorithm includes: receiving an input at a processing device, the input including data related to the target image; performing a retrieving step including retrieving an image from an image database, and, until the image is either accepted or rejected, designating the image as a candidate image; performing an image recognition step including using the processing device to perform an image recognition algorithm on the target and candidate images in order to obtain an image recognition algorithm output; and performing a comparison step including: if the image recognition algorithm output is within a pre-selected range, accepting the candidate image as the target image; and if the image recognition algorithm output is not within the pre-selected range, rejecting the candidate image and repeating the retrieving, image recognition, and comparison steps.

US2010/0183229 A1 refers to a method, system and computer program product for matching image. The images to be matched are represented by feature points and feature vectors and orientations associated with the feature points. First, putative correspondences are determined by using feature vectors. A subset of putative correspondences is selected and the topological equivalence of the subset is determined. The topologically equivalent subset of putative correspondences is used to establish a motion estimation model. An orientation consistency test is performed on the putative correspondences and the corresponding motion estimation transformation that is determined, to avoid an infeasible transformation. A coverage test is performed on the matches that satisfy orientation consistency test. The candidate matches that do not cover a significant portion of one of the images are rejected. The final match images are provided in the order of decreasing matching, in case of multiple images satisfying all the test requirements.

SUMMARY OF THE INVENTION

The Applicant has found that the abovementioned known approaches for implementing object recognition services are affected by several drawbacks. In particular, these approaches are time consuming, being based on iterative procedures and/or requiring a huge amount of data to be processed.

The Applicant has tackled the problem of how to improve these approaches in terms of time consuming and amount of data to be processed.

In particular, the Applicant has tackled the problem to provide a method for comparing image that is reliable in terms of data processing and has good performance in terms of time consuming.

The Applicant has found that by starting from a set of keypoints generated on a first image (query image) and associated to a corresponding set of keypoints generated on a second image (reference image) so as to form a corresponding set of keypoint matches, r a method for comparing image according to the present invention can include a main phase and two subsequent optional phases.

The main phase is applied after the generation of the keypoint matches, and provides for statistically processing the keypoint matches and accordingly assessing, through a geometric consistency check, whether the query image and the reference image may depict a same object or not. More in detail, after the generation of a model function expressing a statistical distribution of the incorrect matches (outliers), a goodness-of-fit test is carried out so as to decide whether the reference image contains a view of an object present in the query image.

In the affirmative case, the method is capable of computing a score to be used for ranking the actual similarity between the object pictured in the reference image and the one pictured in the query image.

The second phase allows to assess how many keypoint matches are inliers among the whole set of keypoint matches.

This phase may be advantageously performed for increasing the precision in visual searching applications.

The third phase allows to specifically identify which keypoint matches are inliers, and which keypoint matches are outliers.

Such phase may be advantageously carried out in some particular applications, such as the augmented reality.

More specifically, according to an aspect of the present invention relates to a method for comparing a first image with a second image. The method comprises identifying first keypoints in the first image and second keypoints in the second image and associating each first keypoint with a corresponding second keypoint in order to form a corresponding keypoint match. For each pair of first keypoints, the method further comprises calculating the distance therebetween for obtaining a corresponding first length. Similarly, for each pair of second keypoints, the method comprises calculating the distance therebetween for obtaining a corresponding second length. The method further comprises calculating a plurality of distance ratios; each distance ratio is based on a length ratio between a selected one between a first length and a second length and a corresponding selected one between a second length and a first length, respectively. The method still further includes calculating a statistical distribution of the plurality of distance ratios and generating a model function expressing a statistical distribution of further distance ratios corresponding to a random selection of keypoints in the first and second images. The method includes comparing said statistical distribution of the plurality of distance ratios with said model function, and assessing whether the first image contains a view of an object depicted in the second image based on said comparison.

According to an embodiment of the present invention, the method includes arranging the distribution of the plurality of distance ratios in the form of a histogram having a plurality of ordered bins each corresponding to a respective interval of distance ratio values; the histogram enumerates for each bin a corresponding number of distance ratios of the distribution having values comprised within the respective interval. For each bin, the method further includes generating a corresponding model probability corresponding to the integral of the model function over said bin. Said comparing a distribution of the plurality of distance ratios with said model function includes comparing the histogram with the model probabilities.

Preferably, said comparing the histogram with the model probabilities comprises performing a Pearson's chi-square test.

Advantageously, said calculating the distance ratios provides for calculating the logarithm of the length ratios.

According to an embodiment of the present invention, the method further comprises estimating a number of incorrect keypoint matches (an incorrect keypoint match is formed by a first and a second keypoints that do not correspond to a same point of a same object depicted in the first and second images). Said estimating the number of incorrect keypoint matches includes initializing a weight parameter to an initial value and repeating: a) weighting the model probabilities with the weight parameter, and b) increasing the value of the weight parameter, until the value of at least one weighted model probability reaches the number of distance ratios enumerated by the histogram in the bin corresponding to said model probability. The method further comprises determining the number of incorrect keypoint matches based on the last value assumed by the weight parameter.

According to an embodiment of the present invention, the method further comprises estimating a number of correct keypoint matches (a correct keypoint match is formed by a first and a second keypoints that correspond to a same point of a same object depicted in the first and second images). Said estimating the number of correct keypoint matches is based on the number of first keypoint matches multiplied by a term equal to the square root of one minus the last value assumed by the weight parameter.

According to a further embodiment of the present invention, the method further comprises calculating a matrix; each element of the matrix corresponds to a respective pair of keypoint matches and has a value corresponding to the difference between the value assumed by the histogram at the bin including the distance ratio of the respective pair of keypoint matches and the weighted model probability corresponding to said bin. The method further comprises finding the dominant eigenvector of the matrix, and identifying which keypoint matches are most likely correct keypoint matches based on said dominant eigenvector.

Said identifying which keypoint matches are most likely correct keypoint matches includes identifying the elements of the eigenvector having the highest absolute values.

Another aspect of the present invention provides for an apparatus for comparing a first image with a second image. The apparatus comprises a first identification unit configured to identify first keypoints in the first image and second keypoints in the second image, and an association unit configured to associate each first keypoint with a corresponding second keypoint in order to form a corresponding keypoint match. A first calculation unit is configured to calculate, for each pair of first keypoints, the distance therebetween for obtaining a corresponding first length, while a second calculation unit is configured to calculate, for each pair of second keypoints, the distance therebetween for obtaining a corresponding second length. The apparatus further comprises a third calculation unit configured to calculate a plurality of distance ratios; each distance ratio is based on a length ratio between a selected one between a first length and a second length and a corresponding selected one between a second length and a first length, respectively. The apparatus still further comprises a fourth calculation unit configured to calculate a statistical distribution of the plurality of distance ratios and a first generation unit configured to generate a model function expressing a statistical distribution of further distance ratios corresponding to a random selection of keypoints in the first and second images. The apparatus comprises a first comparing unit configured to compare said statistical distribution of the plurality of distance ratios with said model function, and an assessing unit configured to assess whether the first image contains a view of an object depicted in the second image based on said comparison.

According to an embodiment of the present invention, the apparatus further comprises an arranging unit configured to arrange the distribution of the plurality of distance ratios in the form of a histogram having a plurality of ordered bins each corresponding to a respective interval of distance ratio values; the histogram enumerates for each bin a corresponding number of distance ratios of the distribution having values comprised within the respective interval. The apparatus further comprises a second generation unit configured to generate, for each bin, a corresponding model probability corresponding to the integral of the model function over said bin. Said first comparing unit includes a second comparing unit configured to compare the histogram with the model probabilities.

According to a further embodiment of the present invention, the apparatus comprises a first estimating unit configured to estimate a number of incorrect keypoint matches; an incorrect keypoint match is formed by a first and a second keypoints that do not correspond to a same point of a same object depicted in the first and second images. The first estimating unit includes an initialization unit configured to initialize a weight parameter to an initial value and a weighting unit configured to repeat the operations: a) weighting the model probabilities with the weight parameter, and b) increasing the value of the weight parameter, until the value of at least one weighted model probability reaches the number of distance ratios enumerated by the histogram in the bin corresponding to said model probability. The apparatus further including a determining unit configured to determine the number of incorrect keypoint matches based on the last value assumed by the weight parameter.

Preferably, the apparatus further comprises a second estimating unit configured to estimate a number of correct keypoint matches; said second estimating unit is configured to estimate the number of correct keypoint matches based on the number of first keypoint matches multiplied by a term equal to the square root of one minus the last value assumed by the weight parameter.

According to a still further embodiment of the present invention, the apparatus further includes a fifth calculation unit configured to calculate a matrix; each element of the matrix corresponds to a respective pair of keypoint matches and has a value corresponding to the difference between the value assumed by the histogram at the bin including the distance ratio of the respective pair of keypoint matches and the weighted model probability corresponding to said bin. The apparatus further including a finding unit configured to find the dominant eigenvector of the matrix, and a second identification unit configured to identify which keypoint matches are most likely correct keypoint matches based on said dominant eigenvector.

A still further aspect of the present invention provides for a system, which includes a keypoint detection unit configured to receive a query image and identify corresponding first keypoints in said image and a feature computation unit configured to describe the local aspect of said first keypoints through corresponding first local descriptors. The system further includes a reference database storing a plurality of reference images; for each reference image, the reference database further stores corresponding second keypoints and corresponding second local descriptors of the second keypoints. The system further includes a feature matching unit configured to compare, for each reference image of at least one group of reference images, the first local descriptors with the second local descriptors of said reference image, and accordingly associate the first keypoints with the second keypoints of said reference image to generate a corresponding set of keypoint matches. The system still further includes a selection unit configured to select a subset of reference figures based on the comparisons carried out by the feature matching unit, and an optimization unit configured to calculate, for each pair comprising the query image and a reference image of the subset, the number of correct keypoint matches.

According to an embodiment of the present invention, the system further comprises a visual search server and a plurality of terminals configured to exchange data with the visual search server through a network.

According to an embodiment of the present invention, the visual search server includes the keypoint detection unit, the feature computation unit, the reference database, the feature matching unit, the selection unit and the optimization unit.

According to another embodiment of the present invention, the visual search server includes the reference database, the feature matching unit, the selection unit and the optimization unit, and each terminal includes a respective keypoint detection unit and a respective feature computation unit.

According to a still further embodiment of the present invention, the visual search server includes the reference database, and each terminal includes a respective keypoint detection unit, a respective feature computation unit, a respective feature matching unit, a respective selection unit, a respective optimization unit and a respective local database. Each terminal is configured to receive from the visual search server a respective set of second keypoints and corresponding second local descriptors of the second keypoints stored in the reference database, and the local database of the terminal is configured to store said received set of second keypoints and second local descriptors; said stored set of second keypoints and second local descriptors corresponds to the reference images of the at least one group of reference images.

BRIEF DESCRIPTION OF THE DRAWINGS

These and other features and advantages of the present invention will be made evident by the following description of some exemplary and non-limitative embodiments thereof, to be read in conjunction with the attached drawings, wherein.

DETAILED DESCRIPTION OF EXEMPLARY EMBODIMENTS OF THE INVENTION

Figure 1A:
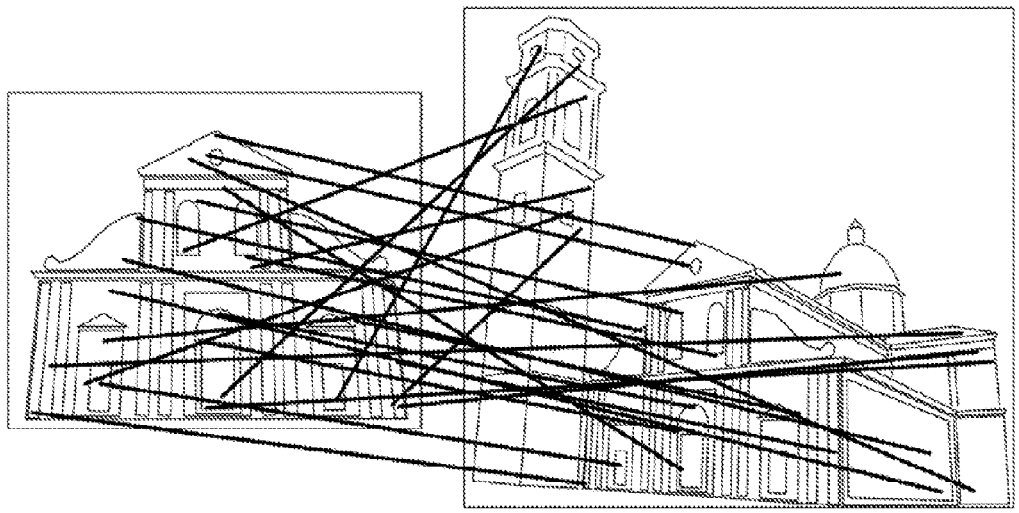
FIG. 1A illustrates an example in which keypoints of two images are associated to each other to form keypoint matches.

As already mentioned above, a comparison between two images provides for matching keypoints of the first image with corresponding keypoints of the second image. A keypoint match is said to be correct (inlier) if the corresponding keypoints of the two images correspond to a same point of a same object (depicted in both the two images); conversely, a keypoint match is said to be incorrect (outlier) if the two keypoints do not correspond to a same point of the same object. In the example illustrated in FIG. 1A, wherein each image is a picture of a same object (a church), each keypoint match is depicted with a respective solid line. The keypoint matches illustrated in the exemplary case of FIG. 1A includes both inliers and outliers. A version of the same exemplary case in which the outliers have been removed is instead depicted in FIG. 1B.

In the following of the present description there will be presented a novel image comparison method. Starting from a set of keypoints generated on a first image—referred to as query image, or simply query—associated to a corresponding set of keypoints generated on a second image—referred to as reference image—so as to form a corresponding set of keypoint matches, the proposed method includes a main phase and two subsequent optional phases:

1) The main phase is applied after the generation of the keypoint matches, and provides for statistically processing the keypoint matches and accordingly assessing, through a geometric consistency check, whether the query image and the reference image may depict a same object or not. More in detail, after the generation of a probabilistic model of the incorrect matches (outliers), a goodness-of-fit test is carried out so as to decide whether the reference image contains a view of an object present in the query image. In the affirmative case, the method is capable of computing a score to be used for ranking the actual similarity between the object pictured in the reference image and the one pictured in the query image.

2) The second (optional) phase allows to assess how many keypoint matches are inliers among the whole set of keypoint matches. This phase may be advantageously performed for increasing the precision in visual searching applications.

3) The third phase (optional as well) allows to specifically identify which keypoint matches are inliers, and which keypoint matches are outliers. Such phase may be advantageously carried out in some particular applications, such as the augmented reality.

In Section 1 of the present description there will be introduced the properties of the particular statistic used in this method, and the concept of log distance ratio, both for incorrect and correct matches. The following three sections (Sections 2-4) discloses mathematical and statistical aspects of the three stages of the proposed method. Section 5 discloses the main steps of the three stages of the method. The last section (Section 6) is directed to exemplary applications of the proposed method.

Section 1—The Distance Ratio Statistic

Let it be considered a set of N matched keypoints $$(x_1, y_1), \ldots, (x_i, y_i), \ldots, (x_N, y_N) \tag{1}$$

where $x_i$ contains the coordinates of the i-th keypoint in the query image and $y_i$ contains the coordinates of its matching keypoint in the reference image. A pair $(x_i, y_i)$ is called an inlier if the two keypoints are correctly matched. Conversely, a pair is called an outlier if the keypoints are incorrectly matched.

The proposed method makes use of the so-called log distance ratio (LDR for short) proposed in the above cited paper by Tsai et al.:

$$ldr(x_i, x_j, y_i, y_j) = \ln\left(\frac{\|x_i - x_j\|}{\|y_i - y_j\|}\right). \tag{2}$$

The keypoints must be distinct, i.e., $$x_i \neq x_j, y_i \neq y_j,$$

and the LDR is undefined for i=j. The LDR is a function of the length ratio, an invariant for similarities. Thanks to the presence of the logarithm operator, if the query image is exchanged with the reference image (x becomes y and vice versa), the LDR reverses sign.

Given a set of N matched keypoints $(x_i, y_i)$—including N keypoints $x_i$ on the query image and N corresponding keypoints $y_i$ on the reference image—, there exists a number $$n = \frac{N \cdot (N-1)}{2}$$

of distinct log distance ratios. The statistical distribution of such log distance ratios is expressed in the form of a corresponding histogram, herein referred to as "LDR histogram". The LDR histogram will be denoted by the array $h=[h_1 \ldots h_K]^T$. h is an array of frequencies that arises when counting the observed log distance ratios contained within each of K predefined intervals $T_1, \ldots, T_K$, hereinafter referred to as bins. For example, such bins may be the 25 intervals of width equal to 0.2 between the lower value −2.5 and the upper value 2.5, i.e.:

$$T_1=[-2.5,-2.3), T_2=[-2.3,-2.1), \ldots, T_{25}=[2.3,2.5]$$

Figure 1B:
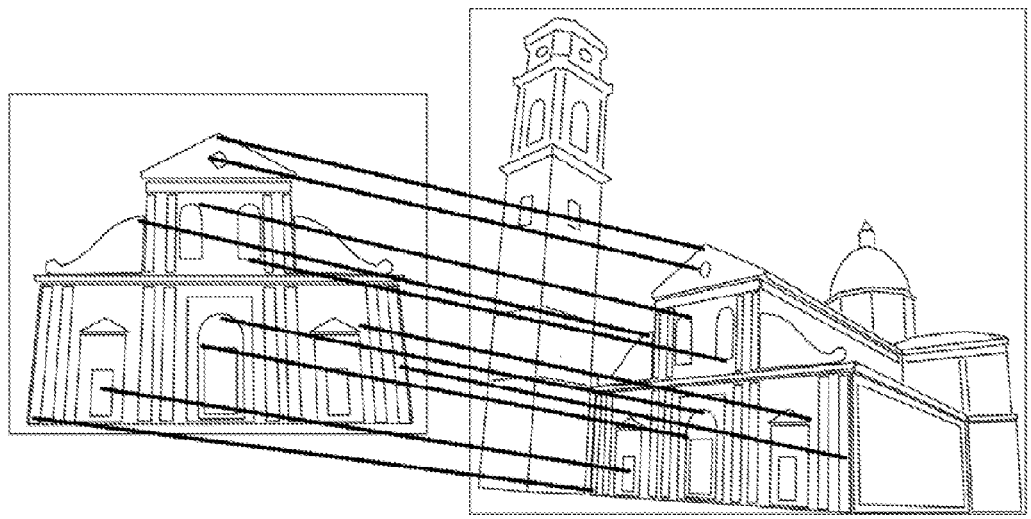
FIG. 1B illustrates the example of FIG. 1A, in which only the inliers are depicted.
Figure 1C:
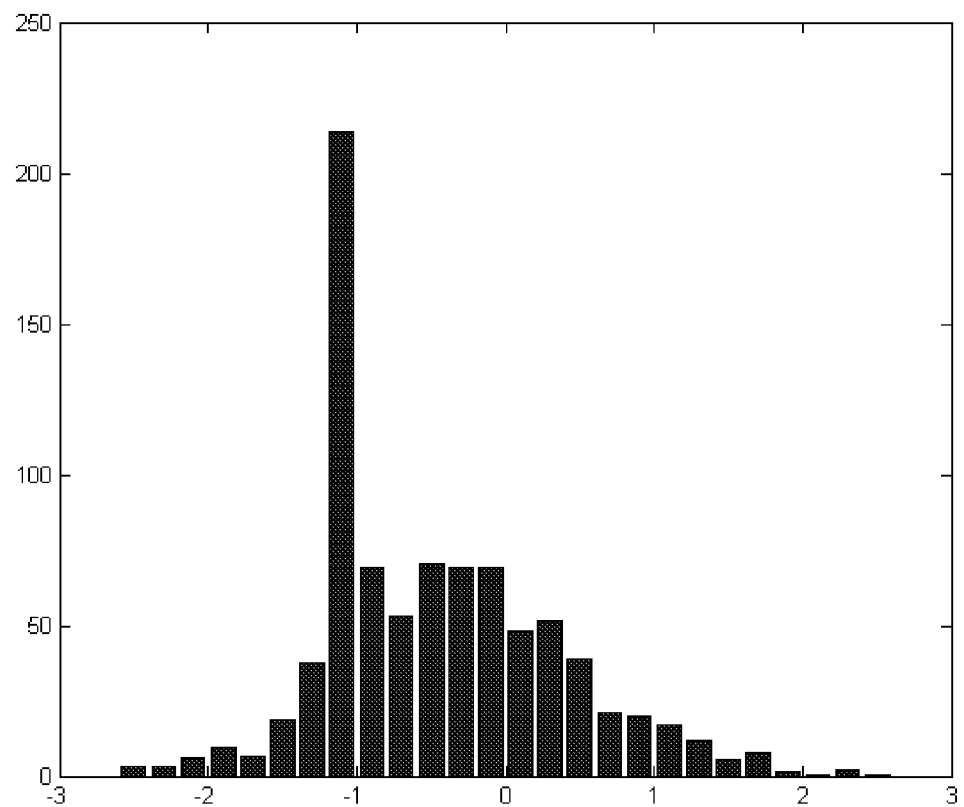
FIG. 1C illustrates a LDR histogram corresponding to the example of FIG. 1A.

An example of LDR histogram corresponding to the case of FIG. 1A is illustrated in FIG. 1C.

The principal advantage of the LDR is that it behaves differently for inlier and outlier pairs. For many image transformations (that govern how the inliers behave) the LDR is restricted to an interval. For the outliers the LDR extends outside such intervals and it has a distinctive probability density function that may be used for goodness-of-fit tests.

The LDR is a function of two generic keypoint pairs, i.e., $(x_i,y_i)$ and $(x_j,y_j)$. Three possible conditions may occur: either both pairs are outliers, both are inliers, or one pair is an inlier while the other is an outlier.

1.1—The LDR when Both Pairs are Outliers

The matching process is not constrained by any knowledge about the geometry of the scene in the images—as such knowledge is not available before the matching is carried out. There is no mechanism that prevents erroneous matches, even if the two images do show the same objects. If the two images do not show the same or very similar objects, then any matching must be considered incorrect.

Even though the matching process is deterministic, the positions of the incorrectly matched keypoints are unpredictable. It is generally impossible to discover any geometric pattern for the outliers, and there are no first principles from which such a pattern might be deduced. Therefore, the incorrect matching is considered as a random process, and the behavior of outliers is modeled through a proper density function, referred to as outlier model function Definition of the Outlier Model Function.

Let A and B be rectangles. Suppose that $x_i, x_j \in A$ and $y_i, y_j \in B$ are points drawn at random, corresponding to random variables $X_i$, $X_j$ and $Y_i$, $Y_j$. Let the random variable C be the LDR $$C=ldr(X_i, X_j, Y_i, Y_j).$$

The outlier model function is the probability density function $f_C(c)$ for C.

The outlier model function may be expressed for two types of keypoint distributions: normal and uniform.

Normally Distributed Keypoint Coordinates.

The assumption that the keypoints are normally distributed leads to a simple formulation of the outlier model function, which is a good approximation of real cases.

It is supposed that the keypoints of the query image are independent and identically distributed (i.i.d.), behaving as a random variable X that is distributed normally with mean µ and variance (½)I:

$$X \sim N(\mu, \tfrac{1}{2}I) \quad (3)$$

It is assumed that the coordinates have been suitably scaled so that the keypoints are distributed over the whole image (note that the variance is the same in the horizontal and vertical directions.) Then, the difference between two keypoints has a normal distribution as well:

$$X_i - X_j \sim N(0, I); i \neq j \quad (4)$$

Suppose that the keypoints $\{Y_n\}$ in the reference image have the same statistics as $\{X_n\}$ and that keypoint $X_n$ is matched to keypoint $Y_n$. Then, the squared distance ratio has an F-distribution with (2, 2) degrees of freedom $$R_{ij}^2 = \frac{\|X_i - X_j\|^2}{\|Y_i - Y_j\|^2} \sim F(2,2), \quad (5)$$

as shown, e.g., in "An introduction to Mathematical Statistics and its Applications" by R. J. Larsen and M. L. Marx, New Jersey, page 338, Prentice-Hall, second edition, 1986.

The probability density function F(2,2) is $$F_S(s) = \frac{1}{(s+1)^2}$$

wherein the symbol for the random variable $R_{ij}^2$ of Equation 5 has been substituted by S, for the sake of simplicity. Since the log distance ratio is being considered (and not the squared distance ratio), the square root and the logarithm is applied to the random variable $S=R_{ij}^2$. Furthermore, in order to account for different sizes of the two images or for different spread of the keypoints in the two images, the function is extended to such cases by multiplying the random variable by a parameter a corresponding to the proportion of the standard deviations of the keypoints in the two images, i.e.:

$$\frac{\sigma_x^2}{\sigma_y^2} = a^2 \quad (6)$$

These modifications to the F(2,2) p.d.f. yield the following outlier model function.

Outlier Model Function.

Let two images have random keypoints $\{X_n\}$ and $\{Y_n\}$, all of which have a bivariate normal distribution with variances $\sigma_x^2$ in the first image and $\sigma_y^2$ in the second image. Let $a^2$ be the proportion of the variances, $$\frac{\sigma_x^2}{\sigma_y^2} = a^2.$$

Applicants have determined that the log distance ratio has the probability density function:

$$f_z(z; a) = 2\left(\frac{ae^z}{e^{2z} + a^2}\right)^2. \quad (7)$$

Figure 2:
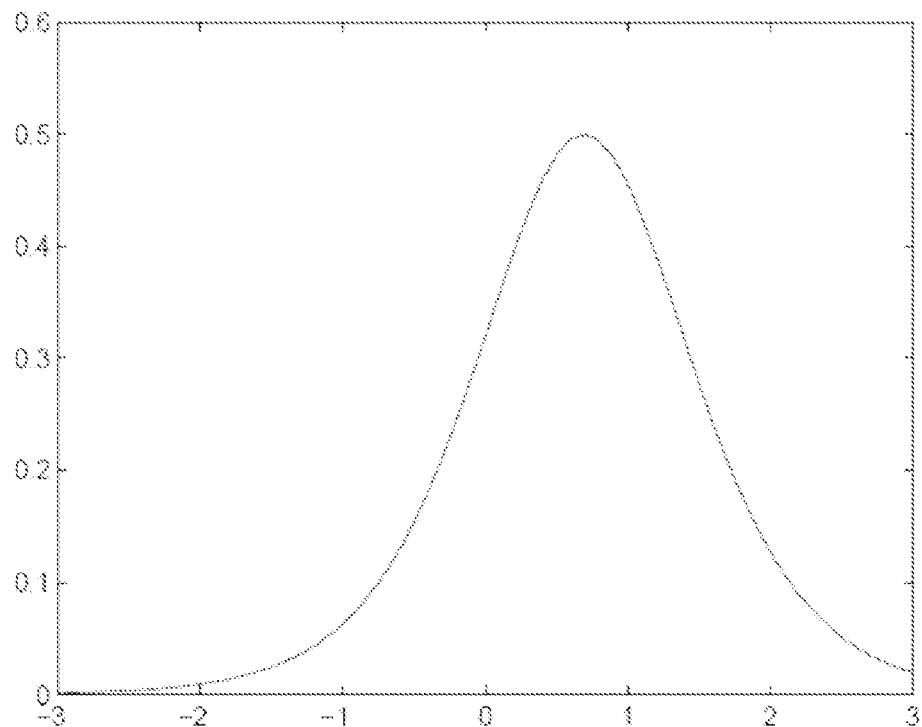
FIG. 2 illustrates the shape of an outlier model function according to an embodiment of the invention.
Figure 3A:
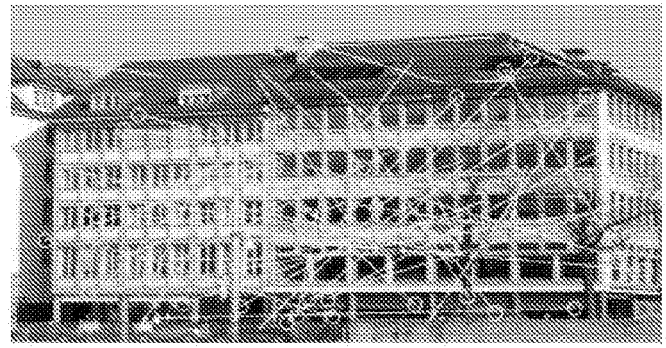
FIGS. 3A-3F illustrate several examples of LDR histograms generated from pair of images taken from the Zurich Building Image Database.
Figure 3A:
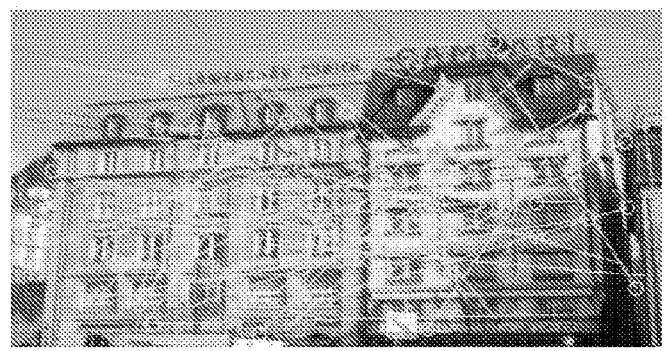
Figure 3A:
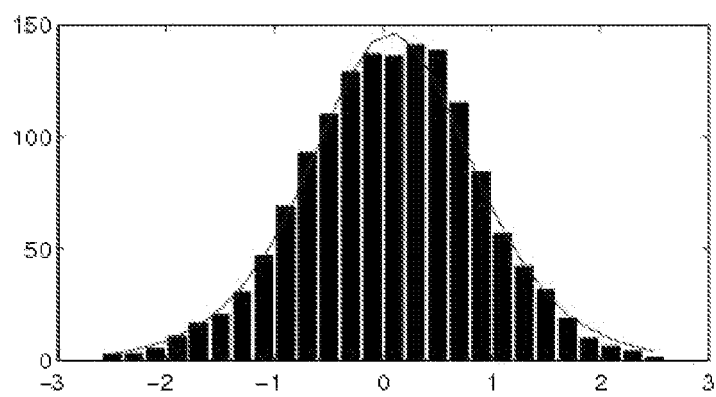
Figure 3B:
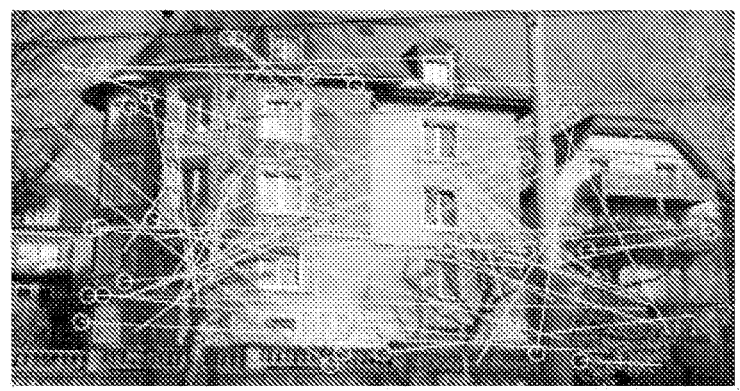
Figure 3B:
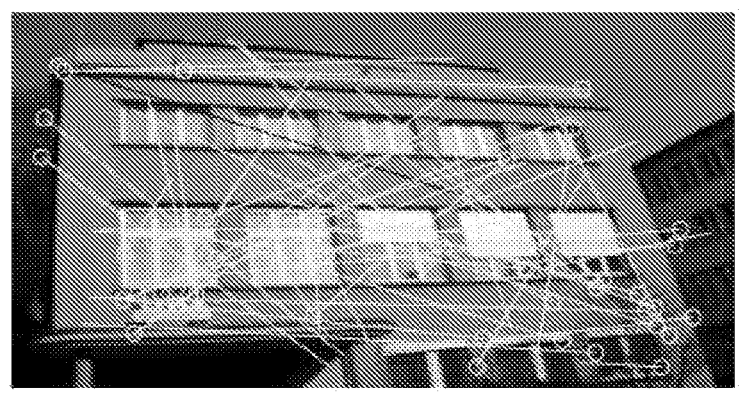
Figure 3B:
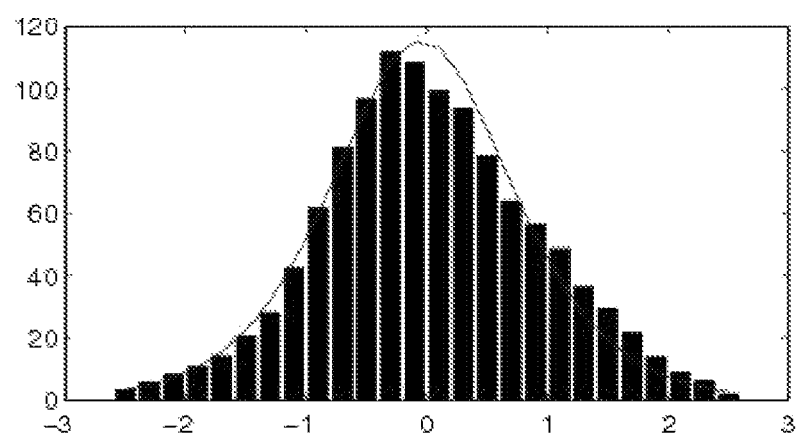
Figure 3C:
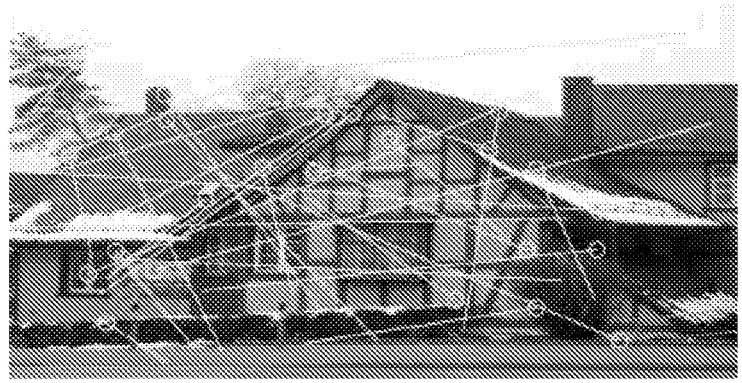
Figure 3C:
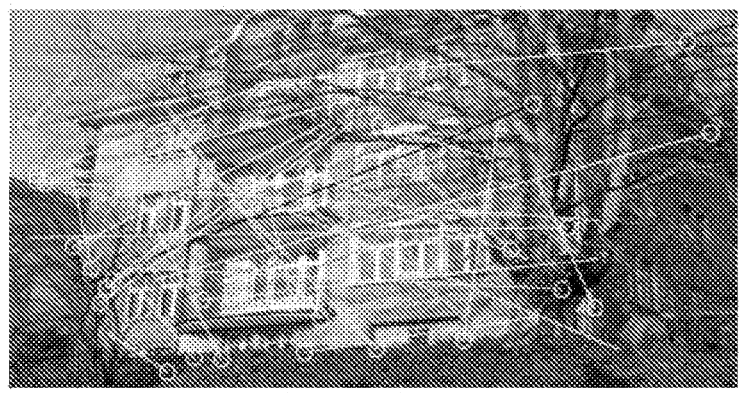
Figure 3C:
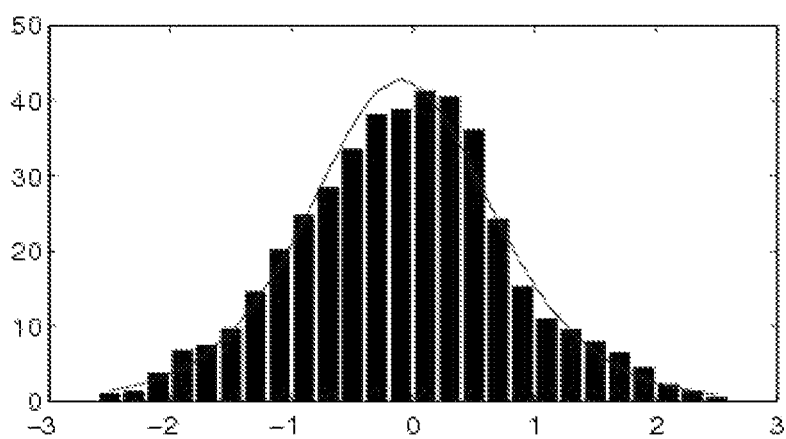
Figure 3D:
Figure 3D:
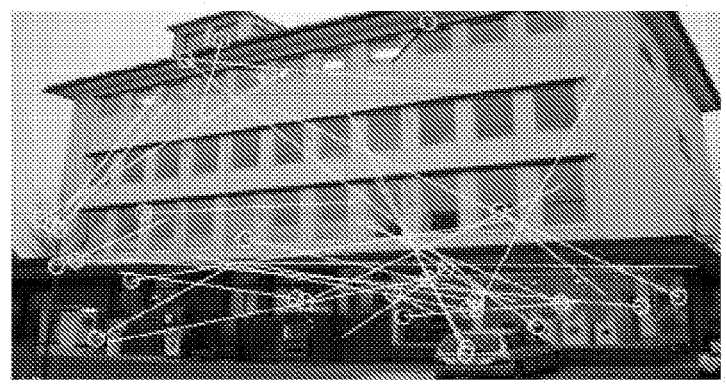
Figure 3D:
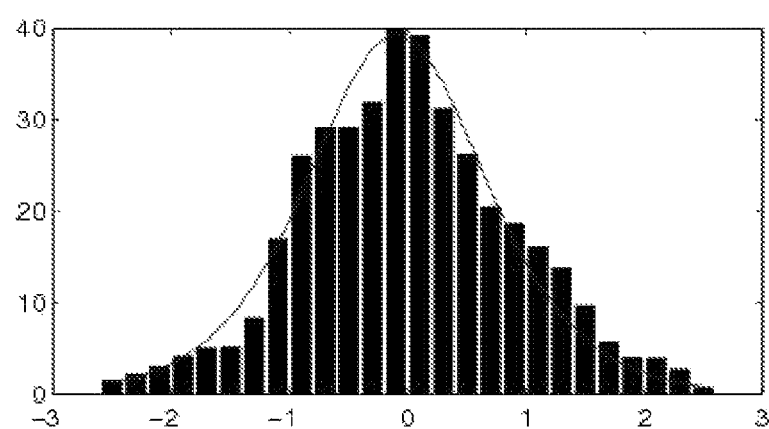
Figure 3E:
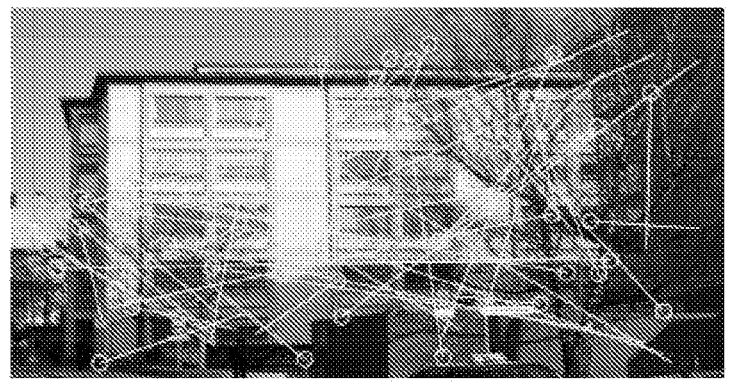
Figure 3E:
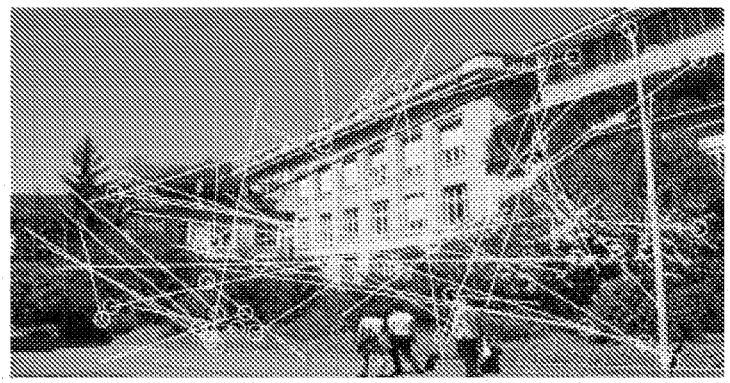
Figure 3E:
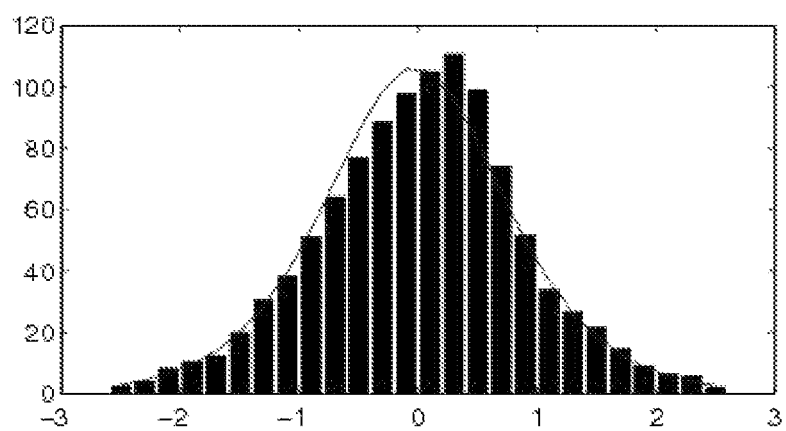
Figure 3F:
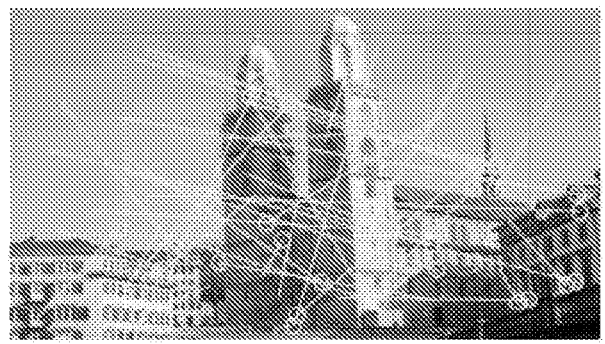
Figure 3F:
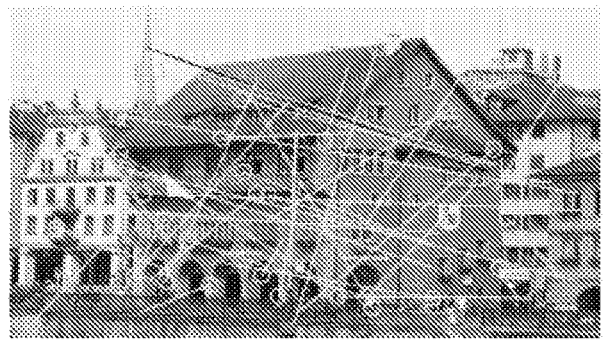
Figure 3F:
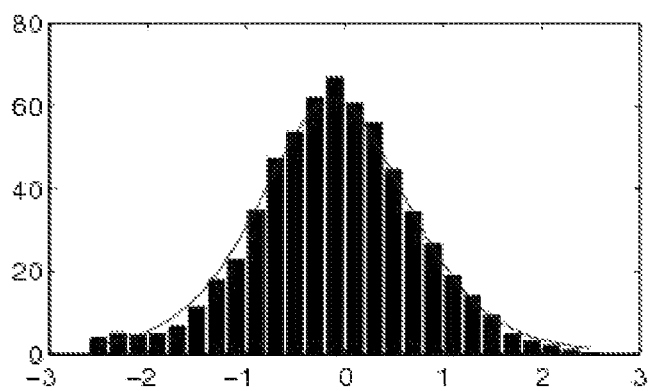

The outlier model function of Equation 7 is at the base of the proposed method. The shape of the outliers model function is illustrated in FIG. 2. It has to be noted that this outliers model function does not account for the aspect ratio of rectangular images, since the horizontal and vertical variances are supposed to be the same.

FIGS. 3A-3F illustrate several examples, each showing a respective pair of images (query image-reference image) taken from the Zurich Building Image Database (consisting of 1005 images, in 5 views each of 201 buildings). The keypoints are indicated by circles, while the lines point to the positions of the matched keypoints in the other image. For each image pair, there is illustrated the LDR histogram and the corresponding outliers model function, in the formulation of Equation 7. It should be noted that all of the keypoint matches must be considered as outliers, since the images show different buildings. From these examples, it can be viewed that the outlier model function approximates well the LDR histogram whenever all matches are outliers.

1.2—The LDR when Both Pairs are Inliers

Generally, the LDR histogram for the case in which all the keypoint matches are inliers is often very different from the LDR histogram for outliers. In a large number of practical cases, the LDR histogram for only inliers is narrower than the LDR histogram for only outliers, i.e., it is equal to zero over a number of bins (specifically, the lateral ones) where the LDR outlier histogram is nonzero.

Since associated keypoints $x_i$ and $y_i$ in the two images are related through a mapping of the same point on the viewed object, it is advantageous to consider the upper and lower bounds of the LDR histograms instead of using probabilistic modeling.

The study herein carried out is limited to points on planar surfaces in the 3D scene, as the primary concern is to recognize objects with limited variations in depth. Planar surfaces approximate the visible portion of many interesting objects in images, such as buildings, books and billboards.

Two images of points on a planar surface are related through a homography H, $$\begin{bmatrix} h \\ d \end{bmatrix} = H \begin{bmatrix} x \\ 1 \end{bmatrix} \quad (8)$$

$$y = \frac{h}{d} \quad (9)$$

where x and y are coordinates of the projections of the same point in two images. Inlier pairs on the same planar surface are therefore related through the same homography. The features of the LDR histograms for affine transformations and general homographies will be now disclosed.

Affine Transformations.

An affine transformation is a special case of a homography $$H_A = \begin{bmatrix} K & t \\ 0^T & 1 \end{bmatrix},$$

such that $$y_n = Kx_n + t.$$

The distance ratio is confined to an interval given by the singular values of the 2×2-matrix K, $$\sigma_{min}\|x_i - x_j\| \le \|y_i - y_j\| \le \sigma_{max}\|x_i - x_j\|.$$

In this case the LDR is in the interval $$ldr(x_i, x_j, y_i, y_j) \in [-\ln \sigma_{max}, -\ln \sigma_{min}] \quad (10)$$

The width of the nonzero portion of the LDR histogram therefore depends on how much the affine transformation deforms objects. For a similarity transformation, the two singular values are equal, so that the LDR histogram has only one bin different from zero. If the affine transformation squeezes lengths at most down to one third and expands at most by a factor of 2, then the two singular values are ⅓ and 2, and the interval for nonzero values of the LDR is [−ln 2,−ln ⅓]≈[−0.7,1.1].

Homographies.

Suppose that $x_i$, $x_j$ and $y_i$, $y_j$ are related through a homography $$H = \begin{bmatrix} A & t \\ w^T & v \end{bmatrix}$$

as in Equations 8 and 9. The LDR is also in this case restricted to an interval $$ldr(x_i, x_j, y_i, y_j) \in [-\ln b, -\ln a] \quad (11)$$

where a is the largest number and b is the smallest such that $$a\|x_i - x_j\| \le \|y_i - y_j\| \le b\|x_i - x_j\| \quad (12)$$

For most practical cases of homographies this interval is narrow with respect to the histogram of the LDR for outliers, mostly due to the nature of the features that are employed. Features like SIFT (Scale-Invariant Feature Transform) and SURF (Speeded Up Robust Features) are invariant to similarity transformations but not to affine transformations, let alone homographies. This means that if the perspective distortion is severe such that [−ln b,−ln a] could theoretically be wide, the keypoints that might produce extreme LDR values will not be associated as their features will have different descriptors. Consequently, the inlier histograms for correctly associated keypoints are likely to remain in a relatively narrow interval.

Figure 4:
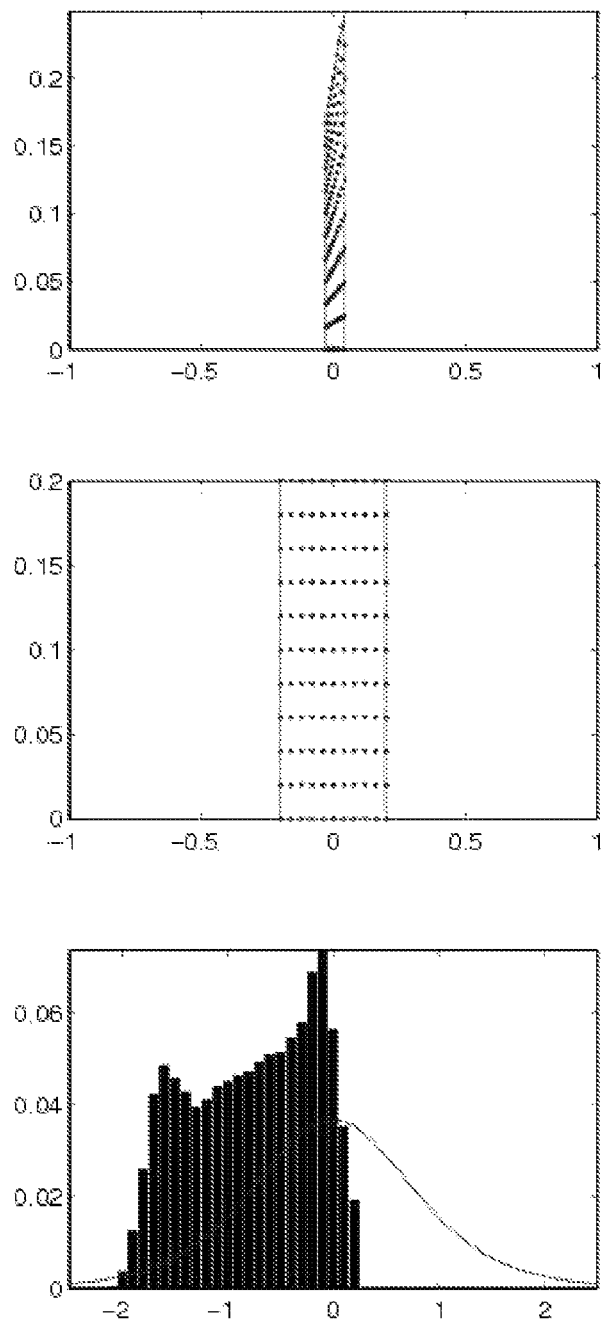
FIG. 4 illustrates an exemplary case in which a query image and a reference image depict a same planar object viewed from very different angles.

FIG. 4 illustrates an exemplary case in which the query image and the reference image depict a same planar object (a rectangle) viewed from very different angles (in the example at issue, −75 and 0 degrees). The bottom diagram of FIG. 4 depicts an LDR histogram and an outliers model function calculated from said image pair.

Figure 5A:
FIGS. 5A and 5B illustrates two exemplary cases in which nearly planar objects are shown with moderate differences in the viewing angles.
Figure 5A:
Figure 5A:
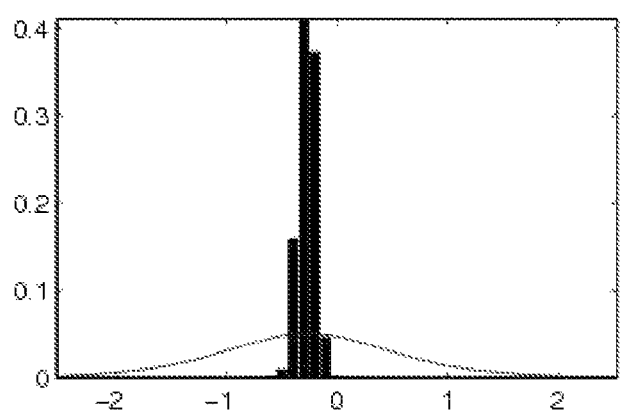
Figure 5B:
Figure 5B:
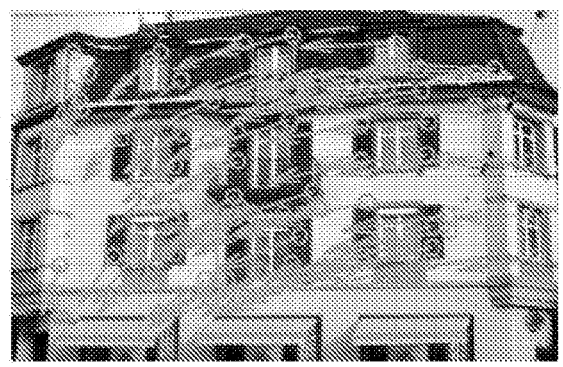
Figure 5B:
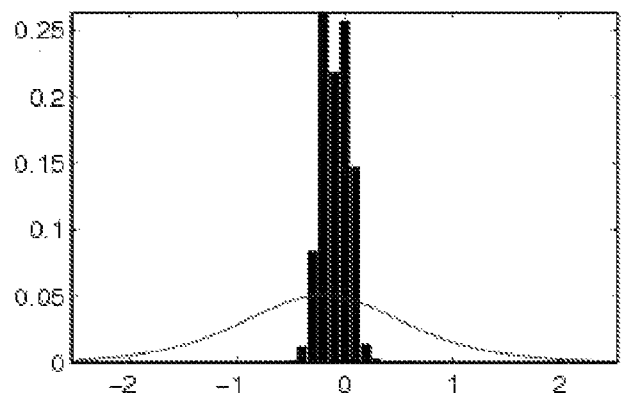

FIGS. 5A and 5B illustrates two exemplary cases in which nearly planar objects (building faces) are shown with moderate differences in the viewing angles. The bottom diagrams of FIGS. 5A and 5B depict the corresponding LDR histograms and the outliers model functions.

1.3—The LDR with Pairs of Both Types

The third alternative provides that the pair $x_i$, $y_i$ is an inlier and $x_j$, $y_j$ is an outlier (or vice versa). In this case as well, it is assumed that the keypoints in one image are randomly distributed, as one cannot know beforehand any geometric pattern or rule that constrains the location of keypoints contained in an unknown image.

Each keypoint can therefore be represented by a random variable, for example with a normal distribution, like in Equation 3. The difference vector between two keypoints is modeled as in Equation 4, since one is taken to be an inlier and the other to be an outlier, and there can be no correlation between them.

However, the F-distribution of Equation 5 does not hold exactly, since the numerator and denominator are not independent, contrarily to the hypothesis for the F-distribution. The keypoints in the case of an inlier/outlier pair are $$(x_i, y_i), (x_j, \pi(x_j))$$

where $\pi$ is the mapping (albeit unknown) of the inlier keypoint in one image onto the other image. The random variable representing the squared distance ratio would in this case be $$Q_{ij}^2 = \frac{\|X_i - X_j\|^2}{\|Y_i - \pi(X_j)\|^2} \qquad (13)$$

where numerator and denominator clearly are not independent, since both are functions of Xj. Finding the probability density for the variable in Equation 13 is quite difficult, but as far as the proposed method is concerned, it might not be necessary. The experience has brought to assume that, with small error, it is possible to model the histogram of the LDR for these two cases (both inlier pairs as opposed to an inlier/outlier pair) with the same model probabilities: the outlier model function of Equation 7.

Section 2—Rejection of Non Matching Images (Phase 1 of the Proposed Method)

The LDR histogram can be used to identify an object that is visible in an image (the query image). Here, 'identification' means finding a reference image containing a view of an object depicted in the query image among the reference images of a reference collection (the reference database). The phase 1 of the proposed method allows to identify objects without the need of explicitly detecting the inlier keypoint pairs between the query image and the reference image.

Phase 1 of the proposed method is a geometry consistency check, which provides for making a binary decision between the hypotheses:

$H_0$: The reference image does not correspond to the query;
$H_1$: The reference image does correspond to the query.

The $H_0$ hypothesis represents the expected state of things: it is known that almost all reference images contain no view of the object in the query. A certain amount of evidence is necessary in order to reject $H_0$ and accept $H_1$ (the exceptional event). This evidence is found in the relation between the LDR histogram and the outlier model function. If the histogram fits the outlier model function well, then the $H_0$ hypothesis is accepted; if not, the $H_1$ hypothesis is accepted.

In order to test such hypotheses, the proposed method provides for carrying out the Pearson's chi-square test (see, for example, pages 402-403 of the already cited work of R. J. Larsen et al.).

Before applying the Pearson's test, the concept of "discretized outlier model function", is introduced.

Let the bins, i.e. the intervals for LDR values used to compose the LDR histogram, be denoted by $T_k$, k=1, ..., K. The discretized outlier model function assigns probability values to each of the K bins, $p: \{1, ..., K\} \to [0,1]$, such that in each k-th bin the value is equal to the integral of the outlier model function over that bin, $$p(k) = \int_{z \in T_k} f_z(z)\,dz \qquad (14)$$

and wherein each value p(k) is called "model probability". For uniformity of notation, the model probabilities will be considered as elements of a sequence $p_k$:

$p_k = p(k); k=1, ..., K$.

The Pearson's chi-square test will be performed between the LDR histogram and the discretized outlier model function.

Pearson's Test.

At the a level of significance, the $H_1$ hypothesis is accepted if $$x = \sum_{k=1}^{K} \frac{(h_k - np_k)^2}{np_k} \geq \chi_{1-\alpha, K-1}^2 \qquad (15)$$

where n=N(N-1)/2 is the total number of observations used for building the LDR histogram, i.e., the number of pairs of keypoint matches $(x_i, y_i)$, $(x_j, y_j)$. The threshold $\chi_{1-\alpha, K-1}^2$ is the 100(1-α) percentile of the chi square distribution with K-1 degrees of freedom.

Accept of the $H_1$ hypothesis means that the reference image is a candidate for representing an object in the query image. The margin by which the threshold is exceeded can be used as a measure of resemblance between the two images:

$$\rho = c - \chi_{1-\alpha, K-1}^2 \qquad (16)$$

see Equation 15. The (index of) the reference image that has the largest p may be selected as the identity for the object in the query image.

If more than one reference images have a large ρ, then either the query image shows several objects present in all said reference images, or said reference images depict very similar objects. This problem might find specific solutions through knowledge of the reference collection or otherwise through knowledge of the identification task at hand.

The α parameter is the probability of accepting a wrong reference image, in the event that the LDR histogram really does originate from a source with the outliers model function as probability density.

Section 3—Estimation of the Number of Inliers (Phase 2 of the Proposed Method)

It is often interesting to know the number of inliers that are present in a set of associated keypoint matches. Such a number may be useful in its own right, or it may be necessary for separating the inliers from the outliers, as will be shown in Section 4.

This number may be estimated exploiting the LDR histogram. Since the keypoint matches fall into two disjoint categories, the histogram is formed by two terms called histogram components, one for each category. The histograms for inliers and outliers are quite different, and indeed this difference is useful for separating the two components and expressing their relative weights.

As previously argued, if the keypoint matches are outliers then the histogram looks like the outliers model function. Moreover, if the histogram resembles the outliers model function, then the pairs are outliers. More in general, if the histogram can be decomposed into two terms where one term looks like the outliers model function, then that term is due to outliers. This principle will be used to guess the number of outliers and even to identify them.

A pair of keypoint matches is an inlier if both $(x_i, y_i)$ and $(x_j, y_j)$ are correctly associated. If one or both of the keypoint matches are incorrectly associated, then the keypoint match pair is an outlier. $P_{in}$ denotes the probability that a pair of keypoint matches contains only inliers and $P_{out}$ the probability that at least one of the elements in the pair is an outlier. Let z be the value of the LDR for a pair of keypoint matches, and let p(z|in) and p(z|out) denote the conditional probability densities. The conditional probability for the outliers is assumed to be the outliers model function of Equation 7, $p(z|out) = f_Z(z)$.

Then the overall probability density has the form $$p_Z(z) = P_{in} \cdot p(z|in) + P_{out} \cdot f_Z(z) \qquad (17)$$

This equation corresponds to the decomposition of the LDR histogram into two terms $$h_k = d_k + g_k; k=1,\ldots,K \quad (18)$$

where $h_k$ denotes the LDR histogram, $d_k$ is its component due to inliers, and $g_k$ is the component due to outliers. The method for estimating the number of inliers is based on the assumption that the outlier component $g_k$ is well approximated by its expected value, which leads to $$h_k = d_k + E(g_k) = d_k + n \cdot P_{out} p_k \quad (19)$$

where the model probability $p_k$ is the integral of the outliers model function over the k-th bin interval and $n=N(N-1)/2$ is the number of pairs of keypoint matches used to construct the LDR histogram. There are two unknown quantities in Equation 19: the outlier probability $P_{out}$ and the inlier component $d_k$. Since the inlier component must be nonnegative, Equation 19 can be rewritten as $$h_k - n \cdot P_{out} p_k \geq 0 \quad (20)$$

which eliminates the inlier component from the equation. We assume that the inlier component is zero over some intervals, as argued in Section 1, so over those intervals the outlier component must be equal to the histogram values. This means that the outlier probability $P_{out}$ should be large enough to make the difference in Equation 20 reach the lower bound 0 for some bin with index k. Therefore, a search is performed for finding the largest possible value of the outlier probability in a small set of predefined values.

Search for the Outlier Probability.

Let $h_k$, $k=1,\ldots,K$ denote the bins in the LDR histogram. Let $p_k$ denote the model probabilities, and let n denote the number of pairs of keypoint matches that are used to construct the histogram. Let $B=\{\beta_1,\ldots,\beta_L\} \subset [0,1]$ be a set of predefined eligible values for $P_{out}$. Applicants have determined that, the estimated probability that a pair of keypoint matches contains at least an outlier is $$P_{out} = \max\{\beta : \beta \in B, h_k \geq n\beta p_k; k=1,\ldots,K\} \quad (21)$$

The probability $1 - P_{out}$ is the relative fraction of inliers among all the pairs of keypoint matches $(x_i, y_i),(x_j, y_j)$. In order to obtain the number of inlier pairs $(x_i, y_i)$, it has to be considered the number N of keypoint pairs and the number $n=N(N-1)/2$ of pairs of keypoint matches, since the histogram is made by counting all pairs $(x_i, y_i),(x_j, y_j)$ such that $i \leq j$. If the number of inlier pairs is denoted by m, then the fraction of keypoint pair couples that consist of inliers is $$\frac{m(m-1)/2}{N(N-1)/2} = 1 - P_{out}. \quad (22)$$

Being based on estimates and assumptions about distributions, Equation 22 has a low degree of precision. Therefore, the approximate solution for m is preferable.

The estimated number of inlier keypoint pairs is then $$m \approx N\sqrt{1-P_{out}} \quad (23)$$

Figure 6:
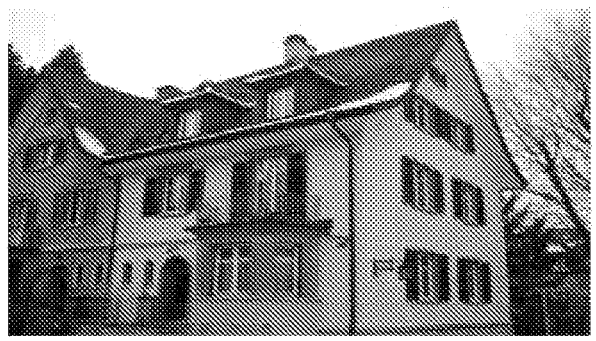
FIG. 6 shows an example of scaling the model probabilities to estimate the number of inliers according to an embodiment of the present invention.
Figure 6:
Figure 6:
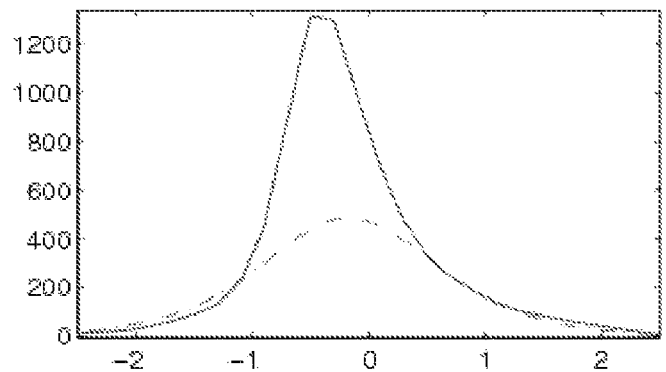

FIG. 6 shows an example of scaling the model probabilities to estimate the number of inliers. In this example, a same object (a house) is depicted in two images. The bottom diagram shows the LDR histogram $h_k$ (plotted as a solid line) and the estimated outlier histogram (plotted as a dash-dotted line). In this case, the number of inliers was estimated to be a third of the total number of keypoints.

Section 4—Identification of Most Likely Inliers (Phase 3 of the Proposed Method)

After the preceding steps have been completed, all the necessary quantities are available to determine the inlier histogram component, $$d_k = h_k - n \cdot P_{out} p_k$$

(see Equation 19). This component may be used to separate inliers and outliers, as shown in this section.

Each pair of keypoint matches corresponds to a log distance ratio value, and the inlier histogram component expresses how probable it is that the pair contains inliers. This information is used to formulate a likelihood function with a binary value for each keypoint pair as parameters; the value 1 means that the pair is an inlier, 0 means that it is an outlier. With a given number of inliers as a constraint, the parameters that maximize this likelihood function will indicate the most likely set of inliers.

Let N be the number of keypoint matches, and let u be a binary vector of N elements $$u \in \{0,1\}^N \quad (24)$$

Elements with value 1 indicate that the corresponding keypoint pairs are inliers, those with value 0 indicate outliers. A procedure like the one in the previous section produces an estimate of the number m of inliers (Equation 22), so it is possible to add the constraint $$\sum_{n=1}^{N} u_n = m \quad (25)$$

The LDR of Equation 2 is known for each pair of keypoint matches, $$z_{ij} = ldr(x_i, x_j, y_i, y_j); i \neq j \quad (26)$$

Ideally, if one had known the conditional probability density for inliers, one could assign a value of likelihood to any hypothesis of inlier sets, simply by summing all the probabilities for the inliers, $$L(u) = \sum_{i: u_i=1} \sum_{j: u_j=1 \wedge i \neq j} p(z_{ij}/in) \quad (27)$$

As u is binary, this sum may be written $$L(u) = \sum_{i=1}^{N} \sum_{j=1, i \neq j}^{N} u_i u_j p(z_{ij}/in) \quad (28)$$

The binary vector u that maximizes L in Equation 27 under the constraints of Equations 23 and 24 represents the most likely set of m inliers.

Equation 27 must be modified to yield a practical algorithm. In the absence of a closed form for the inlier probability density p(z|in), it is replaced by the inlier histogram component d of Equation 19. In order to see this passage, it is useful to introduce a quantizer q $$q(z) = \arg\min_{k=1,\ldots,K} \|z - \zeta_k\| \quad (29)$$

that produces the index to the bin center (among all bin centers $\zeta_1,\ldots,\zeta_K$) that is nearest to the value z. This allows for the approximation $$p(z|in) \approx p(\zeta_{q(z)}|in) \quad (30)$$

The following equation shows that this approximated value of the probability is proportional to the expected value for the inlier component of the LDR histogram:

$$E(d_k) = n \cdot P_{in} \int_{z \in T_k} p(z/in) \, dz \approx n P_{in} \delta p(\zeta_k / in), \quad (31)$$

where the proportionality constants are: n, the total number of pairs of keypoint matches; $P_{in}$, the probability that both pairs in a couple are inliers; and $\delta$, the width of a bin.

The ideal likelihood function in Equation 27 may now be replaced by $$G(u) = \sum_{i=1}^{N} \sum_{j=1, i \neq j}^{N} u_i u_j d_{q(z_{ij})}, \quad (32)$$

where the constant factors of Equation 31 have been omitted, as they do not move the solution that maximizes G(u).

On matrix form the above equation becomes:

$$G(u) = u^T D u \quad (33)$$

where the matrix D contains values from the inlier histogram with $$D_{i,j} = \begin{cases} d_{q(z_{ij})} & i \neq j \\ 0 & i = j \end{cases} \quad (34)$$

as element i, j.

The inlier identification problem can now be expressed as:

$$\text{maximize } u^T D u \quad (35)$$
$$\text{subject to } u \in \{0, 1\}^N$$
$$\sum_{n=1}^{N} u_n = m$$

When the matrix D has full rank, the optimum is very hard to compute. A route to an approximate solution is provided in "Improving shape retrieval by spectral matching and met similarity" by A. Egozi, Y. Keller and H. Guterman, IEEE Transactions on Image Processing, vol 19, pages 1319-1326, May 2010, which confronts a problem similar to that of Equation 33. Here, the binary optimization is replaced by the simpler $$\text{maximize } w^T D w$$
$$\text{subject to } w \in R^N, \|w\| = 1 \quad (36)$$

where the solution is the dominant eigenvector of D (the eigenvector that corresponds to the largest eigenvalue). The elements of this vector are often either close to zero or close to a maximum value (the sign has been chosen so that the largest values are positive). Then, the eigenvector w is used to obtain a binary vector u, by taking its m largest elements (m is the estimated number of inliers of Equation 22), according to the following relationships;

$$[w^*, i] = \text{sort}(w, \text{'descend'}) \quad (37)$$

$$u_{i(n)} = \begin{cases} 1, & n = 1, \ldots, m \\ 0, & n = m+1, \ldots, N \end{cases} \quad (38)$$

wherein sort(w,'descend') is the function of Matlab (by MathWorks) which sorts the elements of the array w in descending order, generating a corresponding ordered array w*. The function sort(w,'descend') generates a further array i whose elements are the indexes of the elements of the array w, ordered as in the array w*.

The result u is a good approximation of the inlier set, as it is possible to verify in practical experiments.

Fast Eigenvector Computation

The estimated inliers correspond to the m largest elements in the dominant eigenvector of D. The goal is to keep the eigenvector computation as fast as possible, also at the expense of some precision. Methods for finding the dominant eigenvector are known in the art (see for example the power iteration and the Rayleigh quotient iteration disclosed in "Numerical Linear Algebra" by L. Tredethen and D. Bau, *The Society for Industrial and Applied Mathematics*, 1997.

Both methods are iterative and rely on an initial guess of the dominant eigenvector, and a rough-and-ready candidate is the mean column which comes close for a matrix of non negative entries like D.

Section 5—Main Steps of the Method

Figure 7A:
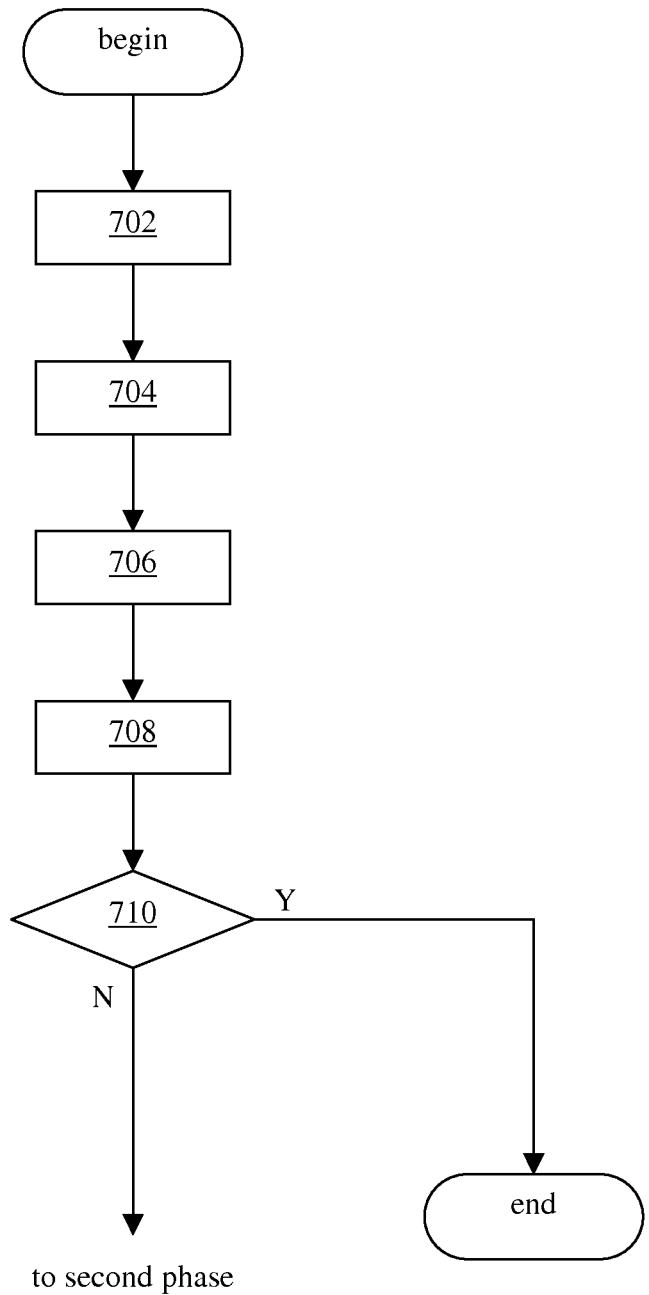
FIG. 7A is a flow chart illustrating the main steps of the first phase of the method according to an embodiment of the present invention.
Figure 7B:
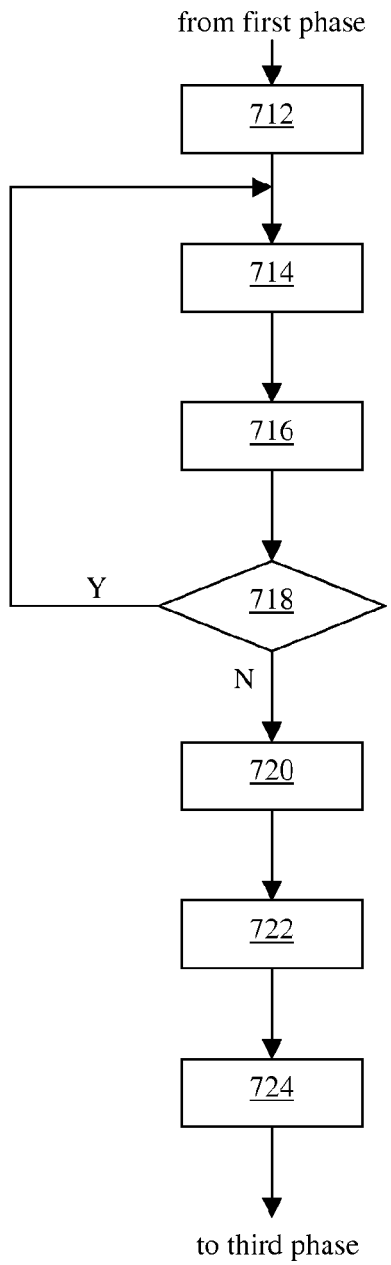
FIG. 7B is a flow chart illustrating the main steps of the second phase of the method according to an embodiment of the present invention.
Figure 7C:
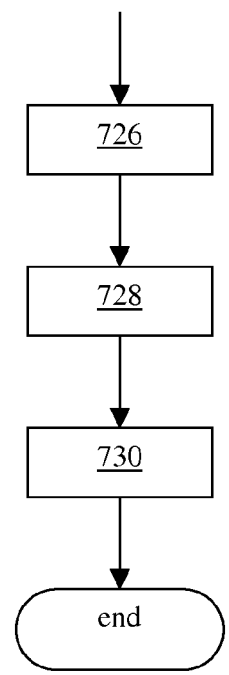
FIG. 7C is a flow chart illustrating the main steps of the third phase of the method according to an embodiment of the present invention.

The main steps of the previously described method will be now illustrated in FIGS. 7A-7C.

Specifically, FIG. 7A is a flow chart illustrating the main steps of the first phase of the method according to an embodiment of the present invention. As already mentioned above, the first phase of the method provides for assessing whether a first image and a second image depict a same object or not.

It is assumed to start with a pair of images to be compared, i.e., a first image (the query image) comprising N keypoints $x_i$ and a second image (the reference image) comprising N keypoints $y_i$. Each keypoint $x_i$ on the query image is associated to a corresponding keypoint $y_i$ on the reference image so as to define a respective keypoint match $(x_i, y_i)$ The first step provides for generating a distance ratio histogram from the keypoint matches $(x_i, y_i)$ using a function of distance ratio which is invariant for similarities. For example, the Log Distance Ratio (LDR) histogram is generated from the keypoint matches $(x_i, y_i)$ using Equation 2 (block 702).

A corresponding outlier model function is then generated by using a probability density function associated to the function of distance ratio used in the first step, for example by using Equation 7 (block 704) in case of a Log Distance Ration (LDR) function as defined in Equation 2.

The next step consists of discretizing the outlier model function previously calculated (block 706), for example by applying Equation 14 to the previously calculated outlier model function in order to obtain a discretized version thereof.

The LDR histogram is then compared to the discretized outlier model function by using Pearson's test (Equation 15) for assessing whether all the keypoint matches are to be considered random (block 708).

Specifically, in case the outcome of Pearson's test entails a good fit of the LDR histogram with the discretized outlier model (exit branch Y of block 710), it means that all or almost all the keypoint matches are outliers, and thus the reference image does not show any object depicted in the query image. Then, the method ends.

Conversely, if the outcome of Pearson's test implies that the LDR histogram does not fit the discretized outlier model (exit branch N of block 710), it means that many of the keypoint matches are likely to be inliers, and thus the reference image may probably show an object already depicted in the query image. In this latter case, if desired, the method proceeds to the second phase.

FIG. 7B is a flow chart illustrating the main steps of the second phase of the method according to an embodiment of the present invention. This phase, based on the "search for outlier probability" previously described, allows to assess how many keypoint matches are inliers among the set of keypoint matches.

The first step provides for initializing the factor $\beta$ of Equation 21 (block 712); for example, $\beta$ is initialized to zero.

The factor $\beta$ is used for weighting the discretized outlier model function to be compared with the LDR histogram. The goal of this step is to estimate the probability that any given couple of keypoint matches contain at least an outlier through Equation 21. Specifically, once $n\beta p_k$ is calculated for each k (block 714) and the term $\beta$ is updated by adding a predetermined amount to the value previously assumed (block 716), a comparison is made between the previously calculated $n\beta p_k$ and the corresponding $h_k$ (for each k).

If, for each k, $h_k$ results to be higher than the previously calculated $n\beta p_k$ (exit branch Y of block 718), meaning that the weighted discretized outliers model function is lower than the LDR histogram, a new calculation of $n\beta p_k$ is carried out by exploiting the updated value of $\beta$ (return to block 714).

When instead $n\beta p_k$ reaches $h_k$ for at least one k (exit branch N of block 718), it means that portions of the weighted discretized outliers model function (specifically, the lateral tails thereof) have reached—or exceeded—corresponding portions of the LDR histogram. Thus, according to Equation 21, the probability $P_{out}$ that the pairs of keypoint matches contain at least an outlier is esteemed to be equal to the last value assumed by $\beta$ (block 720). The estimated probability $P_{in}$ that the pairs of keypoint matches contain at least an inlier is thus set equal to $1-P_{out}$ (block 722).

The number m of inliers is then calculated exploiting Equation 23 (block 724).

At this point, if desired, the method proceeds to the third phase.

FIG. 7C is a flow chart illustrating the main steps of the third phase of the method according to an embodiment of the present invention. This phase allows to specifically identify which keypoint matches are inliers, and which keypoint matches are outliers, solving the maximization problem 36.

The first step provides for building the inlier matrix D as depicted in the relationship 34 (block 726).

The maximization problem 36 is then solved to find the dominant eigenvector w of the inlier matrix D (block 728).

Finally, an approximation of the inlier set is calculated by using the previously found eigenvector w in the relationships 37 and 38 (block 730).

The steps of the method described in this section may be carried out by proper processing units, whose structure and function depends on the specific field of application to which they are destined. For example, each processing unit may be a hardware unit specifically designed to perform one or more steps of the method. Moreover, the steps of the method may be carried out by a programmable machine (e.g., a computer) under the control of a corresponding set of instructions.

Section 6—Some Exemplary Applications of the Method

Figure 8:
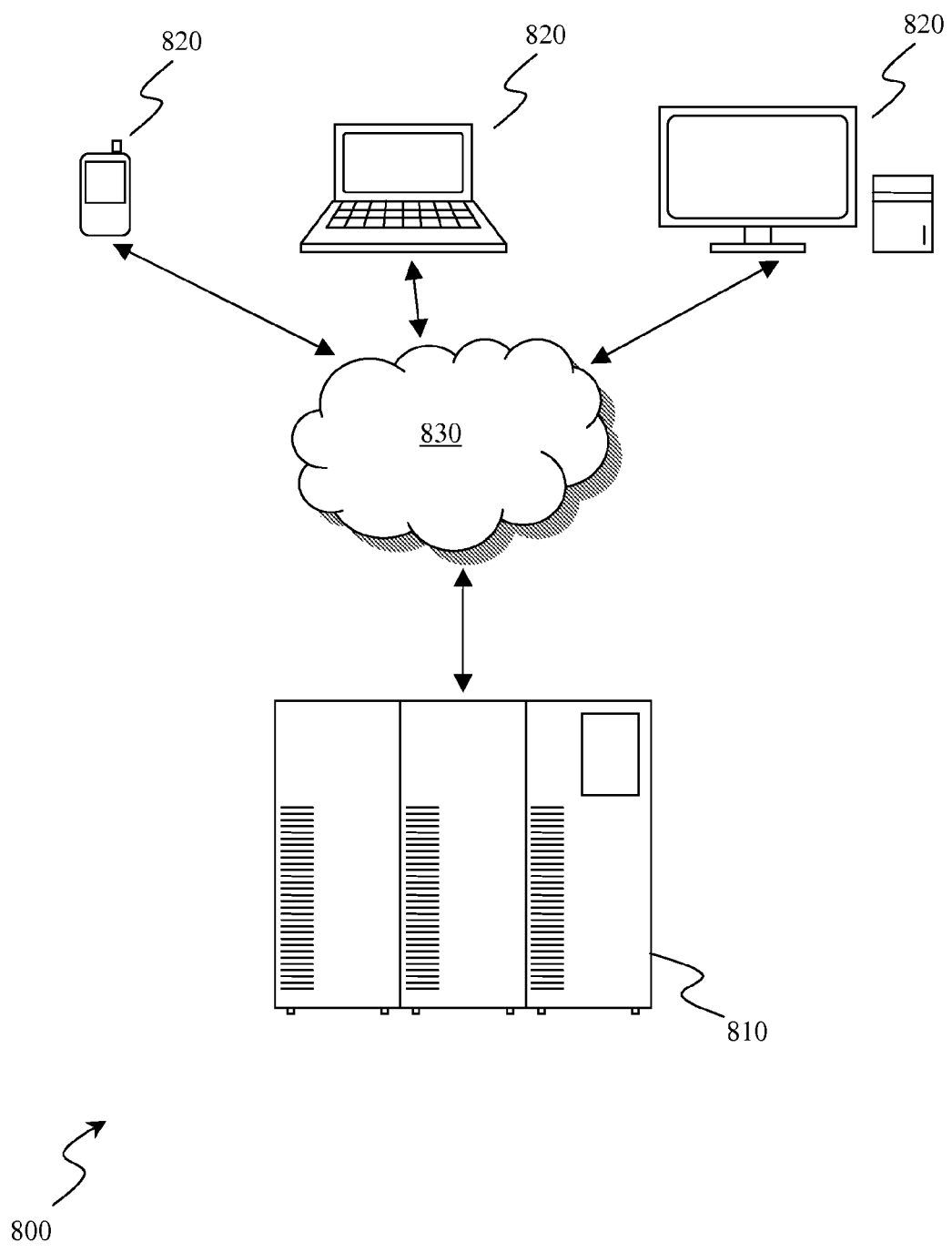
FIG. 8 schematically illustrates a possible scenario wherein the method according to an embodiment of the present invention may be exploited for implementing a visual searching service.

FIG. 8 schematically illustrates a possible scenario wherein the previously described method may be exploited for implementing a visual searching service according to embodiments of the present invention. The scenario of FIG. 8—identified with the reference 800—is structured according to a client-server configuration, wherein a visual search server 810 is configured to interact with a plurality of terminals 820 for exchanging data through an external network 830, such as a MAN, a WAN, a VPN, Internet or a telephone network. Each terminal 820 may be a personal computer, a notebook, a laptop, a personal digital assistant, a smartphone, or whichever electronic device capable of managing a digital image.

Figure 9A:
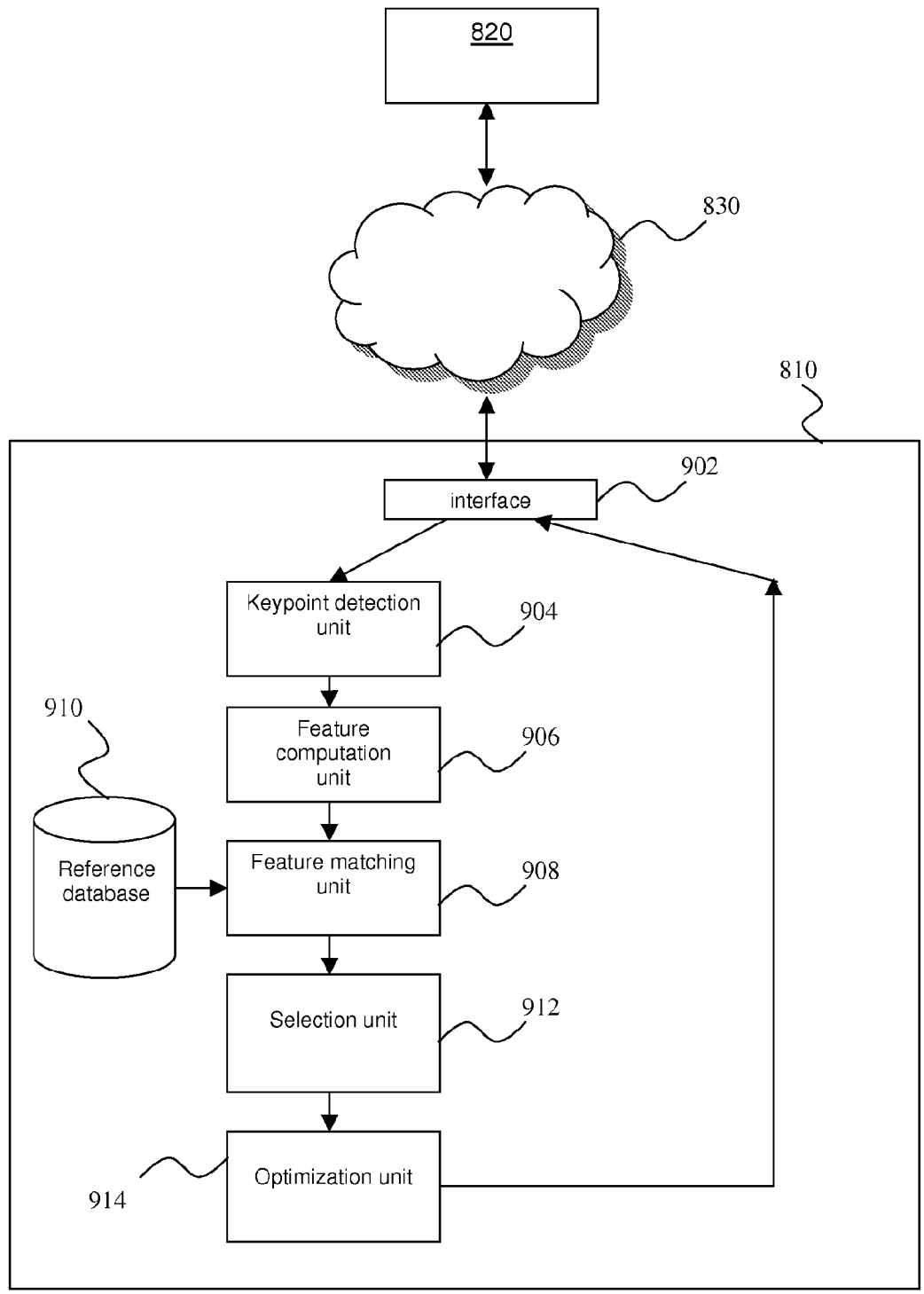
FIG. 9A illustrates a system implementing a visual searching service according to an embodiment of the present invention.

According to an embodiment of the present invention illustrated in FIG. 9A, all the main operations of the visual searching service are carried out by the visual search server 810.

A user of a terminal 820 requesting information related to an object depicted in a picture, sends said picture (which becomes the query image) to the visual search server 810 through the network 830.

The visual search server 810 includes a server interface 902 adapted to interact with the network 830 for receiving/transmitting data from/to the terminals 820. Through the server interface 902, the visual search server 810 receives the query image to be analyzed.

The query image is provided to a keypoint detection unit 904 configured to identify the keypoints included in said image.

Once the keypoints are generated, the local aspect thereof is described by a feature computation unit 906. This operation is carried out by the feature computation unit 906 using known local descriptors, such as the Scale-Invariant Feature Transform (SIFT) and Speeded Up Robust Feature (SURF).

The visual search server 810 further includes a feature matching unit 908 coupled with a reference database 910 storing the reference images to be exploited for the image recognition. A comparison between the local descriptors extracted from the query image and local descriptors of the reference images stored in the reference database is carried out by the feature matching unit 908 using known image feature comparison techniques, for example based on the Euclidean distances among descriptors. The feature matching unit 908 outputs a corresponding list including, for each reference image of the reference database, a corresponding set of keypoint matches. This list may be empty in case the objects depicted in the query images do not correspond to any object depicted in any reference image.

Based on the list generated by the feature matching unit 908, a selection unit 912 selects the first q reference images which share the highest number of keypoint matches with the query image. These reference images are supposed to be the best candidates for including an object depicted in the query image.

According to an embodiment of the present invention, the visual search server 810 further includes an optimization unit 914 configured to implement the method previously described. The optimization unit 914 applies said method to the keypoint matches corresponding to the set of q reference images selected by the selection unit 912: for each pair consisting in the query image and a reference image of the set, the optimization unit 914 calculates the number of correct keypoint matches (inliers). This calculation is carried out according to the first phase of the method, preferably according to the first two phases of the method (i.e., the ones illustrated in FIGS. 7A and 7B). If the third phase of the method illustrated in FIG. 7C is performed as well (for example when it is desired to obtain an indication of where the objects depicted in the query image are located in the reference images), the optimization unit 914 is capable to specifically identify which keypoints matches are to be considered inliers. The reference images of the set that results to include a sufficient number of keypoints correctly matched with corresponding keypoints of the query images are considered to include at least (a portion of) a same object depicted in the query image. These latter reference images are then sent back to the terminal 820 through the network 830 as a result of the visual searching request, possibly ordered based on the number of counted inliers.

Figure 9B:
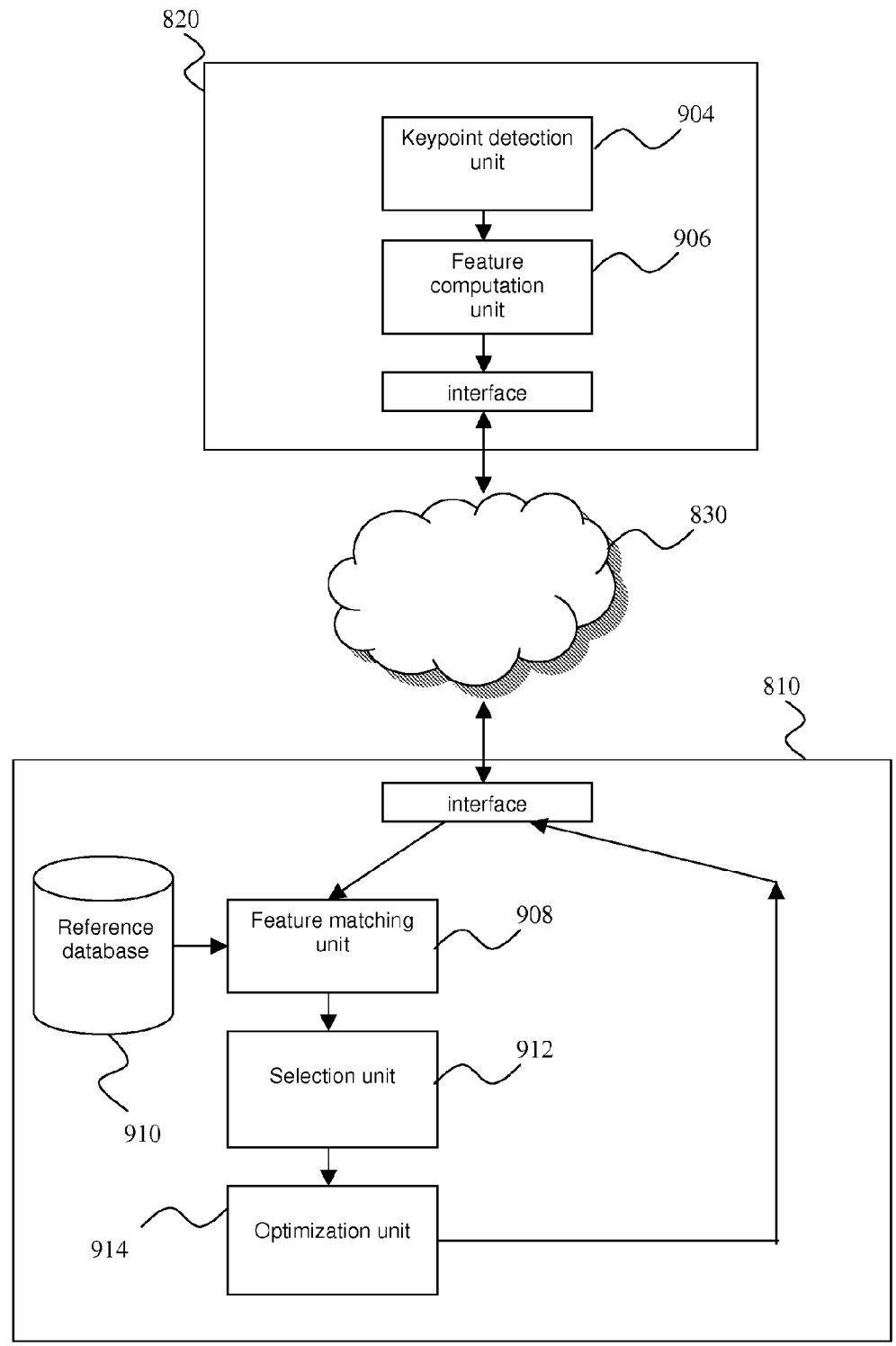
FIG. 9B illustrates a system implementing a visual searching service according to a further embodiment of the present invention.

According to a further embodiment of the present invention illustrated in FIG. 9B, the keypoint detection unit 904 and the feature computation unit 906 are included in the terminals 820 instead of being included in the visual search server 810. In this case, instead of sending the query image to the visual search server 810, each terminal 820 is capable of directly sending the local descriptors locally generated from the query image.

Compared to the previous embodiment, this solution requires the transmission of a lesser amount of data (the local descriptor instead of the entire query image). Moreover, according to this embodiment the computational load to be managed by the visual search server 810 is lowered, allowing the latter to manage more image search requests in the same time.

Figure 9C:
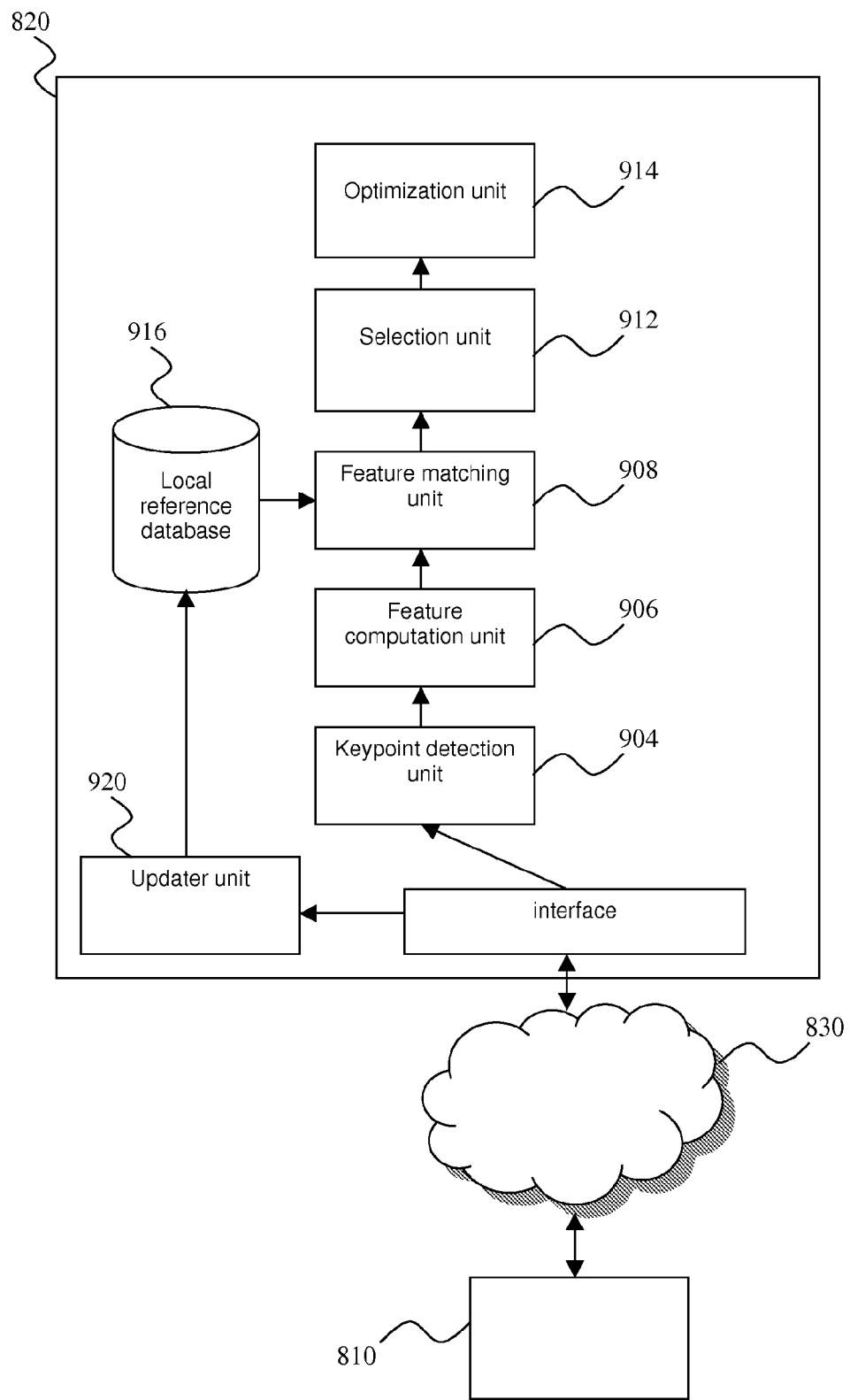
FIG. 9C illustrates a system implementing a visual searching service according to a still further embodiment of the present invention.

According to a still further embodiment of the present invention illustrated in FIG. 9C, almost all the main operations of the visual searching service are carried out by the terminals 820, with the visual search server 810 that just store the keypoints and the local descriptors of the reference images, and sends selected subsets of them to the terminals based on the specific visual search requested by the users of the terminals. For example, in case the terminal 820 is a smartphone equipped with a GPS system and the query image is a picture taken with the camera of the smartphone itself, the selection of which keypoints and local descriptors are to be sent by the visual search server 810 may be based on the actual position of the terminal 820; this solution can be advantageously exploited for some visual search services such as the monument recognition services.

In order to being capable of managing the image comparison operations, the terminal 820 is provided with a local reference database 916 and an updater unit 920, the latter being adapted to receive the keypoints and the local descriptors transmitted by the visual search server 810 and accordingly update the former. It has to be appreciated that it is not strictly necessary to update the local reference database 916 every time an image comparison has to be carried out, being sufficient exploiting the keypoints and the local descriptors already stored therein. For example, the local reference database 916 may be updated by the visual search server 810 only once a day.

Compared with the previous embodiments, this solution is faster, since the amount of data to be transmitted is strongly reduced. Therefore, this solution is particularly suited for the augmented reality applications.

A further possible application of the proposed method is the automatic calibration of video cameras belonging to a stereoscopic camera system. The objective of the calibration is the generation of the so-called fundamental matrix, i.e., a matrix which describes the intrinsic and extrinsic parameters of the acquisition system. The intrinsic parameters describe the camera configurations (e.g., the focal length), while the extrinsic parameters describe the position of the camera within the space.

Figure 10:
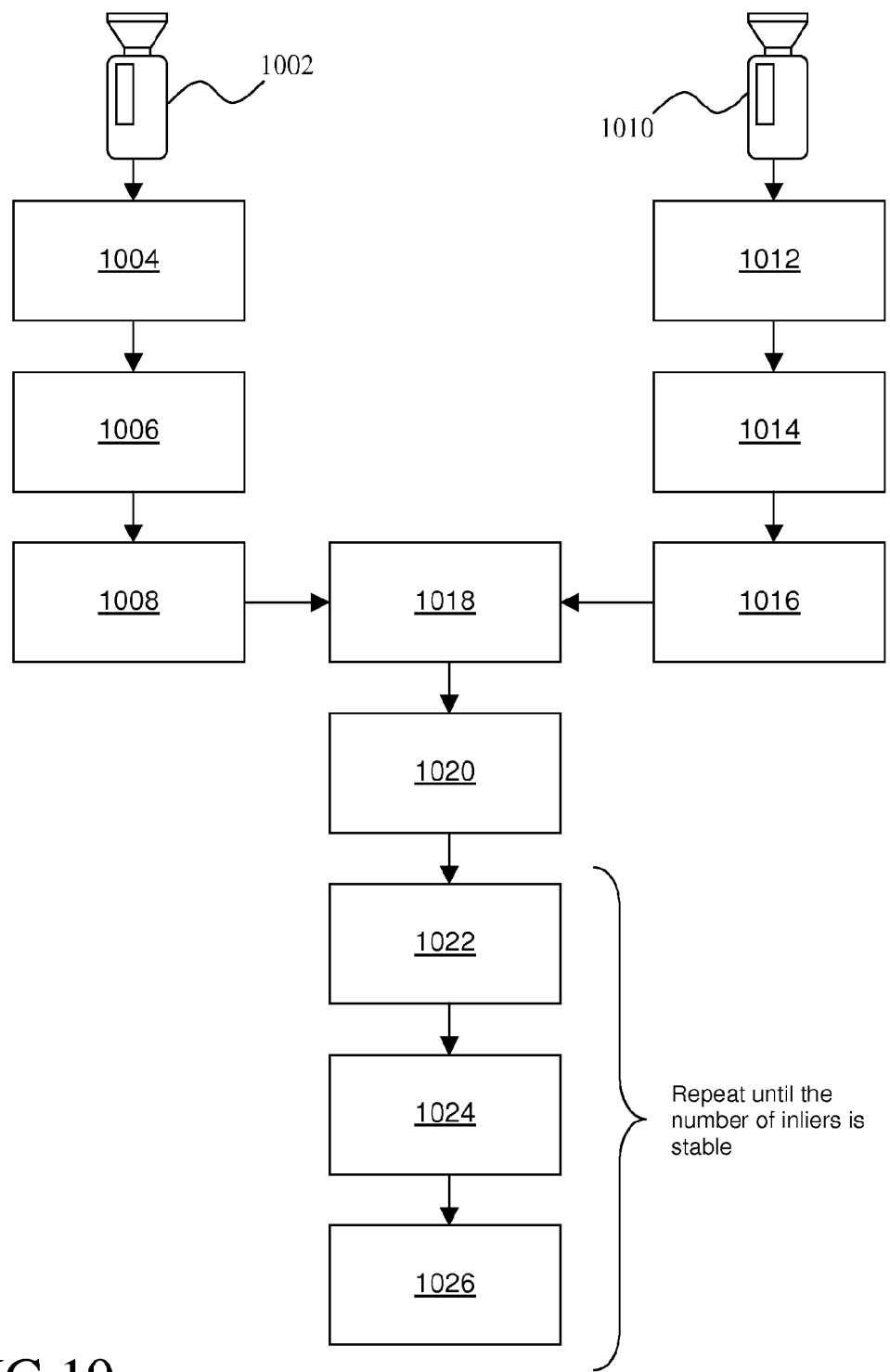
FIG. 10 is a flow chart illustrating main steps of an automatic video camera calibration method according to an embodiment of the present invention.

As illustrated in the schematic flow chart of FIG. 10, a first camera 1002 acquires a first image (block 1004), which is processed in order to identify corresponding first keypoints (block 1006). Once the first keypoints are identified, the local aspect thereof is described through corresponding first local descriptors (block 1008). Similarly, a second camera 1010 acquires a second image (block 1012), which is processed in order to find corresponding second keypoints (block 1014). Then, the local aspect of those keypoints is described through corresponding second local descriptors (block 1016).

By comparing the first local descriptors with the second local descriptors, keypoint matches between the first and second images are generated (block 1018). Then, by applying the three phases of the method illustrated in FIGS. 7A-7C, the keypoint matches that are inliers are identified (block 1020).

Once the inliers have been identified, an iterative procedure is carried out for estimating the fundamental matrix (block 1022) in order to find new keypoint matches (block 1024). These operations may be carried out following the procedure described in "In defense of the Eight-Point Algorithm" by R. Hartley, *IEEE Transactions on pattern analysis and machine intelligence*, Vol 19, No. 6, June 1997. The new keypoint matches are then processed again with the three phases of the method illustrated in FIGS. 7A-7C in order to identify the inliers (block 1026). This procedure (i.e., the one corresponding to blocks 1022, 1024 and 1026) is reiterated until the number of inliers is stable.

The previous description presents and discusses in detail several embodiments of the present invention; nevertheless, several changes to the described embodiments, as well as different invention embodiments are possible, without departing from the scope defined by the appended claims.

For example, although in the present description reference has been made to the log distance ratio (LDR), similar considerations apply if the histograms are construed with a difference distance ratio, such as a plain distance ratio, without the logarithm; moreover, similar considerations apply if the histograms are construed with multiples and/or powers of the log distance ratio.

Furthermore, nothing prevents from expressing the statistical distribution of the distance ratios with a representation different from a histogram; in this case, the Pearson's test should be substituted by an equivalent test compatible with the chosen specific representation.

Moreover, the concepts of the present inventions can be applied even if the widths of the bins of the histograms are different to each other.

The invention claimed is:

1. A method for comparing a first image with a second image, comprising:
    identifying first keypoints in the first image and second keypoints in the second image by a computer:
    associating each first keypoint with a corresponding second keypoint to form a corresponding keypoint match;
    for each pair of first keypoints, calculating a distance therebetween for obtaining a corresponding first length;
    for each pair of second keypoints, calculating a distance therebetween for obtaining a corresponding second length;
    calculating a first plurality of distance ratios, each distance ratio being based on a length ratio between one of the first lengths and corresponding one of the second lengths;
    calculating a statistical distribution of the first plurality of distance ratios;
    generating a model function expressing a statistical distribution of a second plurality of distance ratios corresponding to a random selection of keypoints in the first and second images;
    comparing the statistical distribution of the first plurality of distance ratios with the model function; and
    assessing whether the first image contains a view of an object depicted in the second image based on the comparison.

2. The method of claim 1, further comprising:
    arranging the statistical distribution of the first plurality of distance ratios in a form of a histogram having a plurality of ordered bins each corresponding to a respective interval of distance ratio values, the histogram enumerating for each bin a corresponding number of distance ratios of the distribution having values comprised within the respective interval; and for each bin, generating a corresponding model probability corresponding to an integral of a model function over the bin, wherein:
the comparing a distribution of the first plurality of distance ratios with the model function includes comparing the histogram with the model probabilities.

3. The method of claim 2, wherein the comparing the histogram with the model probabilities comprises performing a Pearson's chi-square test.

4. The method of claim 1, wherein the calculating the distance ratios provides for calculating the logarithm of the length ratios.

5. The method of claim 2, further comprising:
estimating a number of incorrect keypoint matches, an incorrect keypoint match being formed by first and second keypoints that do not correspond to a same point of a same object depicted in the first and second images, the estimating the number of incorrect keypoint matches including:
initializing a weight parameter to an initial value;
repeating following operations a) and b):
a) weighting the model probabilities with the weight parameter;
b) increasing the value of the weight parameter,
until the value of at least one weighted model probability reaches the number of distance ratios enumerated by the histogram in the bin corresponding to the model probability, and
determining a number of incorrect keypoint matches based on a last value assumed by the weight parameter.

6. The method of claim 5, further comprising:
estimating a number of correct keypoint matches, a correct keypoint match being formed by a first and a second keypoints that correspond to a same point of a same object depicted in the first and second images,
the estimating the number of correct keypoint matches being based on a number of first keypoint matches multiplied by a term equal to a square root of one minus the last value assumed by the weight parameter.

7. The method of claim 6, further comprising:
calculating a matrix, each element of the matrix corresponding to a respective pair of keypoint matches and having a value corresponding to a difference between the value assumed by the histogram at the bin including the distance ratio of the respective pair of keypoint matches and the weighted model probability corresponding to the bin;
finding a dominant eigenvector of the matrix; and
identifying which keypoint matches are most likely correct keypoint matches based on the dominant eigenvector.

8. The method of claim 7, wherein the identifying which keypoint matches are most likely correct keypoint matches includes identifying the elements of the eigenvector having the highest absolute values.

9. An apparatus for comparing a first image with a second image, the apparatus comprising:
a first identification unit configured to identify first keypoints in the first image and second keypoints in the second image;
an association unit configured to associate each first keypoint with a corresponding second keypoint to form a corresponding keypoint match;
a first calculation unit configured to calculate, for each pair of first keypoints, a distance therebetween for obtaining a corresponding first length;
a second calculation unit configured to calculate, for each pair of second keypoints, a distance therebetween for obtaining a corresponding second length;
a third calculation unit configured to calculate a first plurality of distance ratios, each distance ratio being based on a length ratio between one of the first lengths and corresponding one of the second lengths;
a fourth calculation unit configured to calculate a statistical distribution of the first plurality of distance ratios;
a first generation unit configured to generate a model function expressing a statistical distribution of a second plurality of distance ratios corresponding to a random selection of keypoints in the first and second images;
a first comparing unit configured to compare the statistical distribution of the first plurality of distance ratios with the model function; and
an assessing unit configured to assess whether the first image contains a view of an object depicted in the second image based on the comparison.

10. The apparatus of claim 9, further comprising:
an arranging unit configured to arrange the statistical distribution of the first plurality of distance ratios in the form of a histogram having a plurality of ordered bins each corresponding to a respective interval of distance ratio values, the histogram enumerating for each bin a corresponding number of distance ratios of the distribution having values comprised within the respective interval; and
a second generation unit configured to generate, for each bin, a corresponding model probability corresponding to an integral of a model function over the bin, wherein:
the first comparing unit includes a second comparing unit configured to compare the histogram with the model probabilities.

11. The apparatus of claim 10, further comprising:
a first estimating unit configured to estimate a number of incorrect keypoint matches, an incorrect keypoint match being formed by a first and a second keypoints that do not correspond to a same point of a same object depicted in the first and second images, the first estimating unit including:
an initialization unit configured to initialize a weight parameter to an initial value;
a weighting unit configured to repeat following operations a) and b):
a) weighting the model probabilities with the weight parameter;
b) increasing the value of the weight parameter,
until the value of at least one weighted model probability reaches a number of distance ratios enumerated by the histogram in the bin corresponding to the model probability, and
a determining unit configured to determine the number of incorrect keypoint matches based on a last value assumed by the weight parameter.

12. The apparatus of claim 11, further comprising:
a second estimating unit configured to estimate a number of correct keypoint matches, a correct keypoint match being formed by a first and a second keypoints that correspond to a same point of a same object depicted in the first and second images,
the second estimating unit being configured to estimate the number of correct keypoint matches based on a number of first keypoint matches multiplied by a term equal to a square root of one minus the last value assumed by the weight parameter.

13. The apparatus of claim 12, further comprising:
a fifth calculation unit configured to calculate a matrix, each element of the matrix corresponding to a respective pair of keypoint matches and having a value corresponding to a difference between the value assumed by the histogram at the bin including the distance ratio of the respective pair of keypoint matches and the weighted model probability corresponding to the bin;
a finding unit configured to find a dominant eigenvector of the matrix, and
a second identification unit configured to identify which keypoint matches are most likely correct keypoint matches based on the dominant eigenvector.

14. A system comprising:
a keypoint detection unit configured to receive a query image and identify corresponding first keypoints in the image;
a feature computation unit configured to describe a local aspect of the first keypoints through corresponding first local descriptors;
a reference database storing a plurality of reference images, for each reference image, the reference database further storing corresponding second keypoints and corresponding second local descriptors of the second keypoints;
a feature matching unit configured to compare, for each reference image of at least one group of reference images, the first local descriptors with the second local descriptors of the reference image, and accordingly associate the first keypoints with the second keypoints of the reference image to generate a corresponding set of keypoint matches;
a selection unit configured to select a subset of reference figures based on the comparisons carried out by the feature matching unit, and an optimization unit configured to calculate, for each pair comprising the query image and a reference image of the subset, the number of correct keypoint matches,
wherein the optimization unit includes the apparatus according to claim 12.

15. The system of claim 14, further comprising:
a visual search server and a plurality of terminals configured to provide query images to the visual search server through a network, wherein:
the visual search server includes the keypoint detection unit, the feature computation unit, the reference database, the feature matching unit, the selection unit, and the optimization unit.

16. The system of claim 14, further comprising:
a visual search server and a plurality of terminals configured to provide query images to the visual search server through a network, wherein:
the visual search server includes the reference database, the feature matching unit, the selection unit, and the optimization unit, and
each terminal includes a respective keypoint detection unit and a respective feature computation unit.

17. The system of claim 14, further comprising:
a visual search server and a plurality of terminals configured to exchange data with the visual search server through a network, wherein:
the visual search server includes the reference database, and
each terminal includes a respective keypoint detection unit, a respective feature computation unit, a respective feature matching unit, a respective selection unit, a respective optimization unit, and a respective local database, wherein:
each terminal is configured to receive from the visual search server a respective set of second keypoints and corresponding second local descriptors of the second keypoints stored in the reference database, and
the local database of the terminal is configured to store the received set of second keypoints and second local descriptors, the stored set of second keypoints and stored second local descriptors corresponding to the reference images of the at least one group of reference images.

* * * * *